(12) United States Patent
Faxér et al.

(10) Patent No.: US 11,757,511 B2
(45) Date of Patent: *Sep. 12, 2023

(54) ORDERING OF CSI IN UCI

(71) Applicant: Telefonaktiebolaget LM Ericsson (publ), Stockholm (SE)

(72) Inventors: Sebastian Faxér, Järfälla (SE); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 47 days.

This patent is subject to a terminal disclaimer.

(21) Appl. No.: 17/106,869

(22) Filed: Nov. 30, 2020

(65) Prior Publication Data

US 2021/0083743 A1    Mar. 18, 2021

Related U.S. Application Data

(63) Continuation of application No. 16/179,588, filed on Nov. 2, 2018, now Pat. No. 10,903,886.
(Continued)

(51) Int. Cl.
*H04B 7/06* (2006.01)
*H04L 5/00* (2006.01)
(Continued)

(52) U.S. Cl.
CPC ......... *H04B 7/0626* (2013.01); *H04B 7/0417* (2013.01); *H04B 7/0486* (2013.01);
(Continued)

(58) Field of Classification Search
CPC .... H04B 7/0626; H04B 7/0632; H04L 5/0057
See application file for complete search history.

(56) References Cited

U.S. PATENT DOCUMENTS 7,139,324 B1    11/2006 Ylitalo et al.
2012/0177092 A1    7/2012 Zirwas
(Continued)

FOREIGN PATENT DOCUMENTS

WO    2020184971 A1    9/2020
WO    2020215341 A1    10/2020

OTHER PUBLICATIONS

Author Unknown, "Technical Specification Group Radio Access Network; NR; Physical layer procedures for data (Release 15)," Technical Specification 38.214, Version 15.5.0, Mar. 2019, 3GPP Organizational Partners, 103 pages.
(Continued)

*Primary Examiner* — Jamal Javaid
*Assistant Examiner* — Ryan C Kavleski
(74) *Attorney, Agent, or Firm* — Withrow & Terranova, PLLC

(57) ABSTRACT

Methods and systems for reporting Channel State Information (CSI), including ordering of CSI in Uplink Control Information (UCI), are provided herein. According to one embodiment, a method performed in a wireless device for reporting CSI comprises at least one of: receiving an indication of a resource allocation for an UL transmission; determining, from the indication, a maximum container size for a CSI report; mapping the one or more information bits of a CSI report to a bitstream, optionally such that a first CSI subset is mapped to more significant bits than a second CSI subset; and omitting the one or more least significant bits of the bitstream.

5 Claims, 14 Drawing Sheets

| BOX #0<br>Part 2 WB CSI for CSI report #1<br>Part 2 WB CSI for CSI report #2<br>...<br>Part 2 WB CSI for CSI report #N | BOX #1<br>Part 2 SB CSI of even SBs for CSI report #1 | BOX #2<br>Part 2 SB CSI of odd SBs for CSI report #1 | BOX #1<br>Part 2 SB CSI of even SBs for CSI report #2 | BOX #2<br>Part 2 SB CSI of odd SBs for CSI report #2 | ... | BOX #2N-1<br>Part 2 SB CSI of even SBs for CSI report #N | BOX #2N<br>Part 2 SB CSI of odd SBs for CSI report #N |

←  High priority                                                                                                 Low priority  →

Related U.S. Application Data

(60) Provisional application No. 62/567,050, filed on Oct. 2, 2017.

(51) Int. Cl.
*H04W 72/21* (2023.01)
*H04B 7/0417* (2017.01)
*H04B 7/0456* (2017.01)

(52) U.S. Cl.
CPC ......... *H04B 7/0632* (2013.01); *H04B 7/0639* (2013.01); *H04L 5/0048* (2013.01); *H04L 5/0057* (2013.01); *H04L 5/0064* (2013.01); *H04W 72/21* (2023.01); *H04L 5/0007* (2013.01)

(56) References Cited

U.S. PATENT DOCUMENTS

| | | | |
|---|---|---|---|
| 2013/0148613 | A1 | 6/2013 | Han et al. |
| 2015/0172024 | A1* | 6/2015 | Kim ................... H04B 7/0486 370/329 |
| 2016/0295573 | A1 | 10/2016 | Lee |
| 2018/0206224 | A1 | 7/2018 | Hwang et al. |
| 2019/0109626 | A1* | 4/2019 | Park ................... H04B 7/0626 |
| 2019/0199420 | A1 | 6/2019 | Faxér et al. |
| 2019/0260450 | A1* | 8/2019 | Kim ................... H04L 5/0053 |
| 2020/0295812 | A1 | 9/2020 | Rahman et al. |
| 2021/0099992 | A1 | 4/2021 | Mao et al. |
| 2021/0409991 | A1 | 12/2021 | Park et al. |
| 2022/0239360 | A1 | 7/2022 | Faxer |

OTHER PUBLICATIONS

Author Unknown, "Technical Specification Group Radio Access Network; NR; Multiplexing and channel coding (Release 15)," Technical Specification 38.212, Version 15.5.0, Mar. 2019, 3GPP Organizational Partners, 101 pages.
Fraunhofer Iis, et al., "R1-1901305: Enhancements on Type-II CSI reporting," 3GPP TSG-RAN WG1 AH-1901, Jan. 21-25, 2019, Taipei, Taiwan, 18 pages.
Nokia, et al., "R1-1720889: Remaining details on CSI reporting," 3GPP TSG RAN WG1 Meeting 91, Nov. 27-Dec. 1, 2017, Reno, Nevada, 7 pages.
Spreadtrum Communications, "R1-1904780: Discussion on Type II CSI overhead reduction," 3GPP TSG RAN WG1 Meeting #96bis, Apr. 8-12, 2019, Xi'an, China, 5 page.
International Search Report and Written Opinion for International Patent Application No. PCT/IB2020/053930, dated Jun. 25, 2020, 18 pages.
International Preliminary Report on Patentability for International Patent Application No. PCT/IB2020/053930, dated Jun. 29, 2021, 33 pages.
Mediatek Inc., "R1-1713693: UCI design for CSI reporting," 3GPP TSG RAN WGI Meeting #90, Aug. 21-25, 2017, Prague, P.R. Czechia, 3 pages.
NTT Docomo, "R1-1713915: Feedback Design for CSI Type I," 3GPP TSG RAN WG1 Meeting #90, Aug. 21-25, 2017, Prague, Czechia, 6 pages.
International Search Report and Written Opinion for International Patent Application No. PCT/IB2018/058568, dated Feb. 22, 2019, 16 pages.
Author Unknown, "Technical Specification Group Radio Access Network; Evolved Universal Terrestrial Radio Access (E-UTRA); Physical channels and modulation (Release 15)," 3GPP TS 36.211, Version 15.3.0, Sep. 27, 2018, 3GPP Organizational Partners, 237 pages.
Author Unknown, "Technical Specification Group Radio Access Network; Evolved Universal Terrestrial Radio Access (E-UTRA); Multiplexing and channel coding (Release 15)," 3GPP TS 36.212, Version 15.3.0, Sep. 27, 2018, 3GPP Organizational Partners, 247 pages.
Author Unknown, "Technical Specification Group Radio Access Network; Evolved Universal Terrestrial Radio Access (E-UTRA); Medium Access Contol (MAC) protocol specification (Release 15)," 3GPP TS 36.321, Version 15.3.0, Oct. 1, 2018, 3GPP Organizational Partners, 127 pages.
Author Unknown, "Technical Specification Group Radio Access Network; NR; Multiplexing and channel coding (Release 15)," 3GPP TS 38.212, Version 15.3.0, Sep. 27, 2018, 3GPP Organizational Partners, 99 pages.
Author Unknown, "Technical Specification Group Radio Access Network; NR; Physical layer procedures for control (Release 15)," 3GPP TS 38.213, Version 15.3.0, Oct. 1, 2018, 3GPP Organizational Partners, 101 pages.
Author Unknown, "Technical Specification Group Radio Access Network; NR; Physical layer procedures for data (Release 15)," 3GPP TS 38.214, Version 15.3.0, Oct. 1, 2018, 3GPP Organizational Partners, 96 pages.
IEEE Computer Society, "IEEE Standard for Information technology— Telecommunications and information exchange between systems— Local and metropolitan area networks—Specific requirements— Part 11: Wireless LAN Medium Access Control (MAC) and Physical Layer (PHY) Specifications," IEEE Standard 802.11, Dec. 14, 2016, The Institute of Electrical and Electronics Engineers, Inc., 3534 pages.
Ericsson, "R1-1718736: On Codebook Subset Restriction," 3GPP TSG RAN WG1 Meeting 90bis, Prague, Czech Republic, Oct. 9-13, 2017, 6 pages.
Samsung et al., "R1-1716901: WF for Open Issues on CSI Reporting," 3GPP TSG-RAN WG1 NR-AH3, Nagoya, Japan, Sep. 18-21, 2017, 19 pages.
Non-Final Office Action for U.S. Appl. No. 16/19,588, dated Feb. 5, 2020, 15 pages.
Notice of Allowance and Examiner-Initiated Interview Summary for U.S. Appl. No. 16/19,588, dated Aug. 4, 2020, 14 pages.
Corrected Notice of Allowability and Examiner-Initiated Interview Summary for U.S. Appl. No. 16/179,588, dated Sep. 30, 2020, 9 pages.
Author Unknown, "Technical Specification Group Radio Access Network; Evolved Universal Terrestrial Radio Access (E-UTRA); Physical layer procedures (Release 15)," 3GPP TS 36.213, Version 15.3.0, Oct. 1, 2018, 3GPP Organizational Partners, 546 pages.
Examination Report for Indian Patent Application No. 202117053998, dated Apr. 29, 2022, 6 pages.
Notice of Reasons for Refusal for Japanese Patent Application No. 2021-564775, dated Jan. 10, 2023, 16 pages.
Non-Final Office Action for U.S. Appl. No. 17/608,477, dated Mar. 9, 2023, 14 pages.

\* cited by examiner

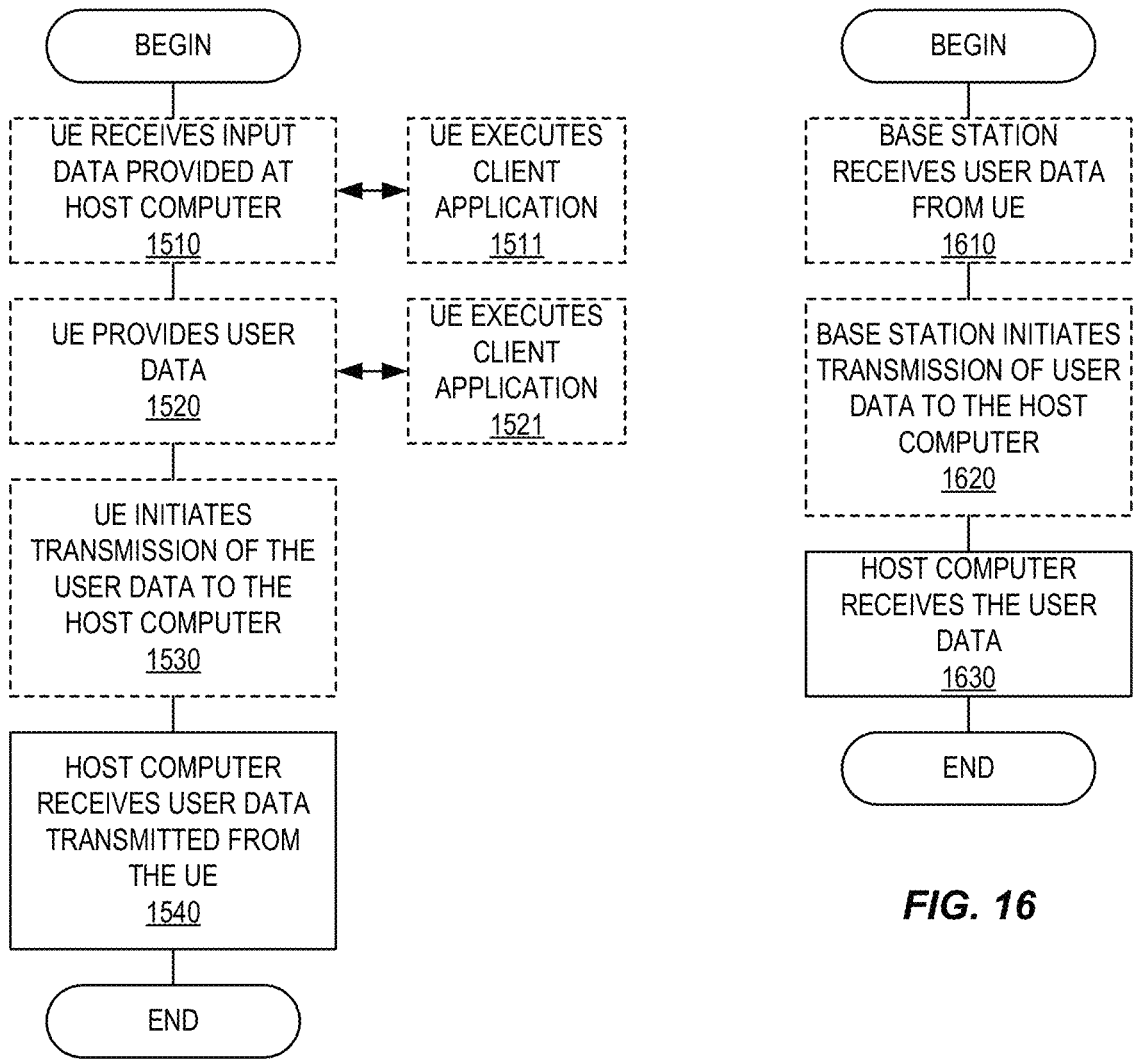

ORDERING OF CSI IN UCI

This application is a continuation of U.S. patent application Ser. No. 16/179,588, filed Nov. 2, 2018, now U.S. Pat. No. 10,903,886 B2, which claims the benefit of provisional patent application Ser. No. 62/567,050, filed Oct. 2, 2017, the disclosures of which are hereby incorporated herein by reference in their entireties.

TECHNICAL FIELD

Channel State Information (CSI) feedback/reporting, New Radio (NR), Semi-Persistent Scheduling (SPS)

INTRODUCTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Existing Technology

The next generation mobile wireless communication system Fifth Generation (5G) or New Radio (NR) will support a diverse set of use cases and a diverse set of deployment scenarios. The later includes deployment at both low frequencies (100s of MHz), similar to LTE today, and very high frequencies (mm waves in the tens of GHz).

Similar to LTE, NR will use OFDM in both the downlink (i.e. from a network node, gNB, eNB, or base station, to a user equipment or UE). In the uplink (i.e. from UE to gNB), both DFT-spread OFDM and OFDM will be supported.

FIG. 1 depicts a portion of an LTE time-frequency grid. The basic NR physical resource can thus be seen as a time-frequency grid similar to the one in LTE as illustrated in FIG. 1, where each resource element corresponds to one OFDM subcarrier during one OFDM symbol interval. Although a subcarrier spacing of $\Delta f=15$ kHz is shown in FIG. 1, different subcarrier spacing values are supported in NR. The supported subcarrier spacing values (also referred to as different numerologies) in NR are given by $\Delta f=(15 \times 2^\alpha)$ kHz where a is a non-negative integer.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth. For NR, a resource block is also 12 subcarriers in frequency but for further study in time domain.

FIG. 2 illustrates an example LTE radio frame. In the time domain, downlink and uplink transmissions in NR will be organized into equally-sized subframes similar to LTE as shown in FIG. 2. In NR, subframe length for a reference numerology of $(15 \times 2^\alpha)$ kHz is exactly $\frac{1}{2}^\alpha$ ms.

Downlink transmissions are dynamically scheduled, i.e., in each subframe the gNB transmits downlink control information (DCI) about which UE data is to be transmitted to and which resource blocks in the current downlink subframe the data is transmitted on. This control signaling is typically transmitted in the first one or two OFDM symbols in each subframe in NR. The control information is carried on Physical Control Channel (PDCCH) and data is carried on Physical Downlink Shared Channel (PDSCH). A UE first detects and decodes PDCCH and if a PDCCH is decoded successfully, it decodes the corresponding PDSCH based on the decoded control information in the PDCCH.

Uplink data transmissions are also dynamically scheduled using PDCCH. Similar to downlink, a UE first decodes uplink grants in PDCCH and then transmits data over the Physical Uplink Shared Channel (PUSCH) based the decoded control information in the uplink grant such as modulation order, coding rate, uplink resource allocation, and etc.

In addition to PUSCH, Physical Uplink Control Channel (PUCCH) is also supported in NR to carry uplink control information (UCI) such as HARQ (Hybrid Automatic Repeat Request) related Acknowledgement (ACK), Negative Acknowledgement (NACK), or Channel State Information (CSI) feedback.

NR supports carrier aggregation of up to 32 component carriers (CCs) in the downlink. Each CC acts as a cell and one of them is a primary cell or carrier. Only the primary carrier may have an associated uplink carrier. In this case, ACK/NACK, SR, and CSI for each downlink component carrier are aggregated and transmitted on the single uplink carrier. The aggregated UCI payload size thus can be quite large.

CSI-RS Transmission Types

Similar to LTE, in NR a unique reference signal is transmitted from each antenna port at the gNB for downlink channel estimation at a UE. Reference signals for downlink channel estimation are commonly referred to as channel state information reference signal (CSI-RS). For N antenna ports, there will be N CSI-RS signals, each associated with one antenna port.

By measuring on CSI-RS, a UE can estimate the effective channel the CSI-RS is traversing including the radio propagation channel and antenna gains at both the gNB and the UE. Mathematically, this implies that if a known CSI-RS signal $x_i$ (i=1, 2, ..., $N_{tx}$) is transmitted on the ith transmit antenna port at gNB, the received signal $y_j$ (j=1, 2, ..., $N_{rx}$) on the jth receive antenna port of a UE can be expressed as Where $h_{i,j}$ is the effective channel between the ith transmit antenna port and the jth receive antenna port, $n_j$ is the receiver noise associated with the jth receive antenna port, $N_{tx}$ is the number of transmit antenna ports at the gNB and $N_{rx}$ is the number of receive antenna ports at the UE.

A UE can estimate the $N_{rx} \times N_{tx}$ effective channel matrix H ($H(i,j)=h_{i,j}$) and thus the channel rank, precoding matrix, and channel quality. This is achieved by using a predesigned codebook for each rank, with each codeword in the codebook being a precoding matrix candidate. A UE searches through the codebook to find a rank, a codeword associated with the rank, and channel quality associated with the rank and precoding matrix to best match the effective channel. The rank, the precoding matrix, and the channel quality are reported in the form of a rank indicator (RI), a precoding matrix indicator (PMI) and a channel quality indicator (CQI) as part of CSI feedback. This results in so-called channel dependent precoding, or closed-loop precoding. Such precoding essentially strives to focus the transmit energy into a subspace which is strong in the sense of conveying much of the transmitted energy to the UE.

A CSI-RS signal is transmitted on a set of time-frequency resource elements (REs) associated with an antenna port. For channel estimation over a system bandwidth, CSI-RS is typically transmitted over the whole system bandwidth. The set of REs used for CSI-RS transmission is referred to as CSI-RS resource. From a UE point of view, an antenna port is equivalent to a CSI-RS that the UE shall use to measure the channel. Up to 32 (i.e. $N_{tx}=32$) antenna ports are supported in NR and thus 32 CSI-RS signals can be configured for a UE.

In NR, the following three types of CSI-RS transmissions are supported:
- Periodic CSI-RS Transmission: CSI-RS is transmitted periodically in certain subframes. This CSI-RS transmission is semi-statically configured using parameters such as CSI-RS resource, periodicity, and subframe offset similar to LTE.

continuing periodically until another subframe (e.g., from the "starting subframe" until the "ending subframe" in FIG. 3).

CSI Feedback Types

In NR, two types of CSI feedbacks will be supported for closed-loop transmission, i.e. Type I and Type II.
- Type I is codebook based PMI feedback with normal resolution targeting single user MIMO (SU-MIMO) transmissions
- Type II is an enhanced CSI feedback with higher resolution targeting multi-user MIMO (MU-MIMO) transmissions For both types of codebook, the PMI for each subband is split up into two indices, $i_1$ and $i_2$. $i_1$ is reported on a wideband basis (i.e. it is the same for all subbands) while $i_2$ is reported per subband (if subband reporting is configured). In Type I CSI reporting, the bitwidth of $i_1$ is on the order of ~10 bits and the bitwidth of $i_2$ is up to 4 bits, which correspond to a relatively low overhead. For Type II reporting, $i_1$ can be up to of 63 bits and $i_2$ up to 38 bits, as is illustrated in Table 1, below.

TABLE 1

Payload of Type II CSI

| L (*) | Rotation: $\lceil \log_2(O_1 O_2) \rceil$ | L-beam selection (**) | Strongest coefficient (1 out of 2L): $\lceil \log_2 2L \rceil$ per layer | WB amp: 3 × (2L − 1) per layer | Total WB payload | SB amp (1 SB): 1 × (K − 1) per layer | SB phase (1 SB): Z × (K − 1) + 2 × (2L − K) per layer | Total payload (WB + 10 SBs) |
|---|---|---|---|---|---|---|---|---|
| Rank 1 payload (bits) | | | | | | | | |
| 2 | 4 | [7 or 8] | 2 | 9 | 22 | 3 | 9 | 142 |
| 3 | 4 | [10 or 12] | 3 | 15 | 32 | 3 | 13 | 192 |
| 4 | 4 | [11 or 16] | 3 | 21 | 39 | 5 | 19 | 279 |
| Rank 2 payload (bits) | | | | | | | | |
| 2 | 4 | [7 or 8] | 4 | 18 | 33 | 6 | 18 | 273 |
| 3 | 4 | [10 or 12] | 6 | 30 | 50 | 6 | 26 | 370 |
| 4 | 4 | [11 or 16] | 6 | 42 | 63 | 10 | 38 | 543 |

Aperiodic CSI-RS Transmission: This is a one-shot CSI-RS transmission that can happen in any subframe. Here, one-shot means that CSI-RS transmission only happens once per trigger. The CSI-RS resources (i.e., the resource element locations which consist of subcarrier locations and OFDM symbol locations) for aperiodic CSI-RS are semi-statically configured. The transmission of aperiodic CSI-RS is triggered by dynamic signaling through PDCCH. The triggering may also include selecting a CSI-RS resource from multiple CSI-RS resources.

Semi-Persistent CSI-RS Transmission: Similar to periodic CSI-RS, resources for semi-persistent CSI-RS transmissions are semi-statically configured with parameters such as periodicity and subframe offset. However, unlike periodic CSI-RS, dynamic signaling is needed to activate and possibly deactivate the CSI-RS transmission.

FIG. 3 illustrates an example of a Semi-Persistent CSI-RS transmission time period. In the embodiment illustrated in FIG. 3, a periodic CSI-RS transmission begins in response to an activation trigger, beginning from one subframe and CSI Reporting Modes In LTE, UEs can be configured to report CSI in periodic or aperiodic reporting modes. Periodic CSI reporting is carried on PUCCH while aperiodic CSI is carried on PUSCH. PUCCH is transmitted in a fixed or configured number of PRBs and using a single spatial layer with QPSK modulation. PUSCH resources carrying aperiodic CSI reporting are dynamically allocated through uplink grants carried over PDCCH or enhanced PDCCH (EPDCCH), and can occupy a variable number of PRBs, use modulation states such as QPSK, 16QAM, and 64 QAM, as well as multiple spatial layers.

In LTE, a periodic CSI report can be scheduled for the same subframes as those containing SPS PUSCH, in which case the periodic CSI reports are piggy backed on PUSCH. This allows periodic CSI to be transmitted using link adaptation, and so periodic CSI can be transmitted in a more spectrally efficient manner than on PUCCH (which always uses QPSK with a fixed number of resources). However, periodic CSI reports are formed such that they fit in the small payload of PUCCH, and so may carry less information even when they are piggy backed on PUSCH, for example by the use of codebook subsampling. By contrast, aperiodic CSI reporting on PUSCH uses the full resolution of the CSI feedback, and is not subsampled. Furthermore, periodic CSI reporting in LTE requires that at least one PUCCH resource be configured for the UE, which is a waste of PUCCH resources which are reserved and may be unused even if the periodic CSI is always carried on PUSCH. Therefore, while LTE can transmit periodic CSI on PUSCH with semi-persistent resource allocation, such CSI is generally less accurate than aperiodic CSI on PUSCH In LTE, the PDCCH UL grant allocates a single resource for all content to be carried on the PUSCH, including UL-SCH, CSI (including RI, CRI, RPI, CQI, and PMI), and HARQ-ACK. Because the size of the message is determined according to the reported RI, CRI, and/or RPI when CSI is piggy backed on PUSCH, the eNB does not know at the time of the UL grant what the size of the UL CSI will be. The eNB must therefore allocate extra resources to ensure that both the CSI and the other content will fit on the PUSCH resource. It should also be noted that CSI on PUSCH always carries complete CSI messages for each cell, CSI process, and/or eMIMO-Type: all configured parameters (i.e. one or more of RI, CRI, RPI, CQI, PMI) to be reported for the cell, CSI process, and/or eMIMO-type are reported together in one transmission on PUSCH.

The UE is generally required to update each new CSI report whether it is reported periodically or aperiodically. However, if the number of CSI reports to be produced is greater than the number of CSI processes, the UE is not required to update the CSI report in order to limit the UE computation complexity. This does not however, mean that the UE is forbidden from updating the report, and so whether a CSI report will be identical to a prior transmitted report in this case is not known.

In NR, in addition to periodic and aperiodic CSI reporting as in LTE, semi-persistent CSI reporting will also be supported. Thus, three modes of CSI reporting will be supported in NR as follows:
  Periodic CSI Reporting: CSI is reported periodically by the UE. Parameters such as periodicity and subframe offset are configured semi-statically, by higher layer signaling from the gNB to the UE.
  Aperiodic CSI Reporting: This mode of CSI reporting involves a single-shot (i.e., one time) CSI report by the UE which is dynamically triggered by the gNB, e.g. by the DCI in PDCCH. Some of the parameters related to the configuration of the aperiodic CSI report are semi-statically configured from the gNB to the UE but the triggering is dynamic.
  Semi-Persistent CSI Reporting: similar to periodic CSI reporting, semi-persistent CSI reporting has a periodicity and subframe offset which may be semi-statically configured by the gNB to the UE. However, a dynamic trigger from gNB to UE may be needed to allow the UE to begin semi-persistent CSI reporting. In some cases, a dynamic trigger from gNB to UE may be needed to command the UE to stop the semi-persistent transmission of CSI reports.

With regards to CSI-RS transmission and CSI reporting, the following combinations will be supported in NR:
  For periodic CSI-RS transmission
    Semi-persistent CSI reporting is dynamically activated/deactivated
    Aperiodic CSI reporting is triggered by DCI
  For semi-persistent transmission of CSI-RS,
    Semi-persistent CSI reporting is activated/deactivated dynamically
    Aperiodic CSI reporting is triggered by DCI
  For aperiodic transmission of CSI-RS,
    Aperiodic CSI reporting is triggered by DCI
    Aperiodic CSI-RS is triggered dynamically CSI Framework in NR It has been agreed that in NR, a UE can be configured with $N \geq 1$ CSI reporting settings, $M \geq 1$ Resource settings, and 1 CSI measurement setting, where the CSI measurement setting includes $L \geq 1$ links and value of L may depend on the UE capability. At least the following configuration parameters are signaled via RRC at least for CSI acquisition.
  N, M, and L are indicated either implicitly or explicitly
  In each CSI reporting setting, at least: reported CSI parameter(s), CSI Type (I or II) if reported, codebook configuration including codebook subset restriction, time-domain behavior, frequency granularity for CQI and PMI, measurement restriction configurations
  In each Resource setting:
    A configuration of $S \geq 1$ CSI-RS resource set(s)
    A configuration of $K_s \geq 1$ CSI-RS resources for each set s, including at least: mapping to REs, the number of ports, time-domain behavior, etc.
    Time domain behavior: aperiodic, periodic or semi-persistent
    RS type which encompasses at least CSI-RS
  In each of the L links in CSI measurement setting: CSI reporting setting indication, Resource setting indication, quantity to be measured (either channel or interference)
    One CSI reporting setting can be linked with one or multiple Resource settings
    Multiple CSI reporting settings can be linked
  At least, the following are dynamically selected by 1:1 or L2 signaling, if applicable.
    One or multiple CSI reporting settings within the CSI measurement setting
    One or multiple CSI-RS resource sets selected from at least one Resource setting
    One or multiple CSI-RS resources selected from at least one CSI-RS resource set Control Signaling LTE control signaling can be carried in a variety of ways, including carrying control information on PDCCH or PUCCH, embedded in the PUSCH, in MAC control elements ('MAC CEs'), or in RRC signaling. Each of these mechanisms is customized to carry a particular kind of control information.

Control information carried on PDCCH, PUCCH, or embedded in ('piggy backed on') PUSCH is physical layer related control information, such as downlink control information (DCI), uplink control information (UCI), as described in 3GPP TS 36.211, 36.212, and 36.213. DCI is generally used to instruct the UE to perform some physical layer function, providing the needed information to perform the function. UCI generally provides the network with needed information, such as HARQ-ACK, scheduling request (SR), channel state information (CSI), including CQI, PMI, RI, and/or CRI. UCI and DCI can be transmitted on a subframe-by-subframe basis, and so are designed to support rapidly varying parameters, including those that can vary with a fast fading radio channel. Because UCI and DCI can be transmitted in every subframe, UCI or DCI corresponding to a given cell tend to be on the order of tens of bits, in order to limit the amount of control overhead.

Control information carried in MAC CEs is carried in MAC headers on the uplink and downlink shared transport channels (UL-SCH and DL-SCH), as described in 3GPP TS 36.321. Since a MAC header does not have a fixed size, control information in MAC CEs can be sent when it is needed, and does not necessarily represent a fixed overhead. Furthermore, MAC CEs can carry larger control payloads efficiently, since they are carried in UL-SCH or DL-SCH transport channels, which benefit from link adaptation, HARQ, and can be turbo coded. MAC CEs are used to perform repetitive tasks that use a fixed set of parameters, such as maintaining timing advance or buffer status reporting, but these tasks generally do not require transmission of a MAC CE on a subframe-by-subframe basis. Consequently, channel state information related to a fast fading radio channel, such as PMI, CQI, RI, and CRI are not carried in MAC CEs in LTE up to Rel-14.

NR UCI Encoding and CSI Omission

In NR, it has been agreed that CSI in UCI when transmitted on PUSCH is split up into two separately encoded parts. Where the first CSI part is of a known payload size (and typically small), containing at least RI and CQI, and where the second CSI part has a variable payload size and contains the remaining CSI parameters such as PMI. Based on decoding the first CSI part, the UE knows the payload size of the second CSI part and can decode it.

FIG. 4A depicts an example CSI that has been split into two parts: Part 1 and Part 2. In the embodiment illustrated in FIG. 4A, Part 1 holds the Wideband (WB) data and Part 2 holds the Subband (SB) data.

One issue with Type II CSI reporting is that the payload can vary drastically depending on if the UE selects RI=1 or RI=2 (as is illustrated in Table 1). As the gNB is unaware of the selected RI when allocating the PUSCH resources, it could potentially allocate a too small resource so that the CSI payload will not fit.

FIG. 4B depicts an example scenario where a gNB has allocated insufficient resources for the CSI payload, i.e., the container size is too small to hold all of the Part 2 data, resulting in the omission of certain CSI bits. In the scenario illustrated in FIG. 4B, the CSI bits for subbands 9 and 10 are omitted.

Therefore, it was decided to introduce a mechanism for how the UE should handle such a case in RAN1 #90-AH3:
  Separately encoded parts of a CSI report on PUSCH carrying UL-SCH have different transmission priority
    Part 1 (used to identify the number of information bits in part 2) has higher priority
      Part 1 is first included in a transmission in their entirety before part 2
    Information bits and/or channel coded bits of part 2 can only be partially transmitted
      Omit CSI parameters corresponding to at least one subbands for part 2
        TBD by RAN1 #90bis: if all of part 2 can be dropped as a special case
        TBD by RAN1 #90bis: specify one of the following omission rules:
          Omitted subbands are determined based on a decimation ratio and/or a priority pattern used to order subband CSI (defined in specification)
          Omitted subbands are determined based on the measured subband CQI included in part 1

Thus, it has been agreed to introduce a CSI omission scheme based on omitting subband CSI.

Problems with Existing Solutions

The agreed-upon mechanism for CSI omission raises certain challenges, however. For example, it is unclear how an efficient CSI omission scheme can be specified, especially taking into account that different CSI reports and CSIs from multiple cells can be multiplexed in the UCI, and that arbitrary PUSCH resource allocations and CSI sizes needs to be supported. These issues have not yet been addressed.

SUMMARY

Certain aspects of the present disclosure and their embodiments may provide solutions to these or other challenges. An efficient CSI omission scheme is achieved by defining an ordering in which the CSIs for the different subbands are mapped to UCI bits. If PUSCH resource allocation is smaller than the CSI payload, the least significant bits are truncated.

Certain embodiments may provide one or more of the following technical advantage(s):
  The CSI omission scheme presented herein is general and can handle multiple CSI reports and/or CSI feedback from multiple cells seamlessly.
  As bits are truncated rather than CSI parameters, arbitrary CSI payload sizes and PUSCH resource allocations can be handled in a general framework without any special rules.
  CSI is being omitted in such a fashion that it minimizes the CSI loss at the gNB, e.g. allowing gNB to interpolate CSI between subbands to estimate omitted CSI.

In some embodiments, a method performed in a wireless device for reporting channel state information (CSI) includes receiving an indication of a resource allocation for an UL transmission; determining, from the indication, a maximum container size for a CSI report; mapping the information bits of a CSI report to a bitstream such that a first CSI subset is mapped to more significant bits than a second CSI subset; and omitting the least significant bits of the bitstream if the determined maximum container size is smaller than the size of the CSI report payload.

In some embodiments, the first and second CSI subset correspond to separately encoded CSI parts.

In some embodiments, the CSI parts comprise at least a first and a second CSI type, wherein the first CSI type can contain at least one of a rank indication (RI) and a channel quality indication (CQI), and the second CSI type contains subband CSI parameters.

In some embodiments, the first CSI subset comprises wideband CSI parameters and the second CSI subset comprises subband CSI parameters.

In some embodiments, additionally, the subband CSI parameters comprise CSIs for multiple subbands and the subbands are mapped to bits according to an interleaving pattern.

In some embodiments, the first CSI subset corresponds to subband CSIs for subbands with subband indices $f_1$ and the second CSI subset corresponds to subband CSIs for subbands with subband indices $f_2$ such that the remainder of $f_1/M$ is smaller than the remainder of $f_2/M$, for some integer M.

In some embodiments, subband CSI corresponding to one or more of different cells and different CSI reports with certain subband index are mapped to consecutive bits.

In some embodiments, the first CSI subset comprises wideband CSI for a plurality of cells, and the second CSI subset comprises subband CSI for the plurality of cells.

BRIEF DESCRIPTION OF THE DRAWINGS

The accompanying drawing figures incorporated in and forming a part of this specification illustrate several aspects of this disclosure, and together with the description serve to explain the principles of the disclosure.

FIG. 15 is a flowchart illustrating methods implemented in a communication system including a host computer, a base station and a user equipment in accordance with some embodiments described herein;

FIG. 16 is a flowchart illustrating methods implemented in a communication system including a host computer, a base station and a user equipment in accordance with some embodiments described herein;

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

In NR it has been agreed that the two separately encoded parts of a CSI report on PUSCH carrying UL-SCH have different transmission priorities, where Part 1 has higher priority than Part 2. The motivation is to introduce a mechanism to deal with the problem when PUSCH resource allocation (RA) is too small to fit the UCI payload, for instance when Type II CSI is used and the UE reports RI=2 while the gNB has only allocated PUSCH resources assuming RI=1 payload size, or, when Type I CSI for multiple cells in a CA scenario is transmitted where the variation of PMI/CQI payload depending on UE's selection of CRI/RI can be large. It has been agreed that information bits and/or channel coded bits of part 2 can be partially transmitted, but the exact scheme still needs to be specified.

In this disclosure, a method for achieving subband-based CSI omission is presented. Regardless of what subband-based omission rules are implemented, the same basic mechanism can be used to determine which information bits shall be omitted from the CSI report. Based on the PUSCH resource allocation, the number of available REs for UCI $Q_{UCI}$ is known (whether $Q_{UCI}$ corresponds to all the REs in a PUSCH RA or a subset of the REs is not yet decided and does not matter for the subsequent reasoning). The number of REs available for the second CSI part can then be calculated as $Q_{P2}=Q_{UCI}-Q_{P1}-Q_{ACK}$, where $Q_{P1}$ is the number of REs for the first CSI part and $Q_{ACK}$ is the number of REs for HARQ-ACK. The total number of information bits that are available for the second CSI part may then be calculated as $$O_{P2} = \left\lfloor \frac{Q_{P2}Q_m}{\beta_{P2}} \right\rfloor,$$

where $\beta_{P2}$ is a parameter, that in some embodiments is an integer, controlling the code rate of the second CSI part. If the number of information bits actually contained in the second CSI part, $O_{P2}'>O_{P2}$, the overflowing bits $\tilde{O}_{P2}=O_{P2}'-O_{P2}$ must be omitted.

Figure 1:
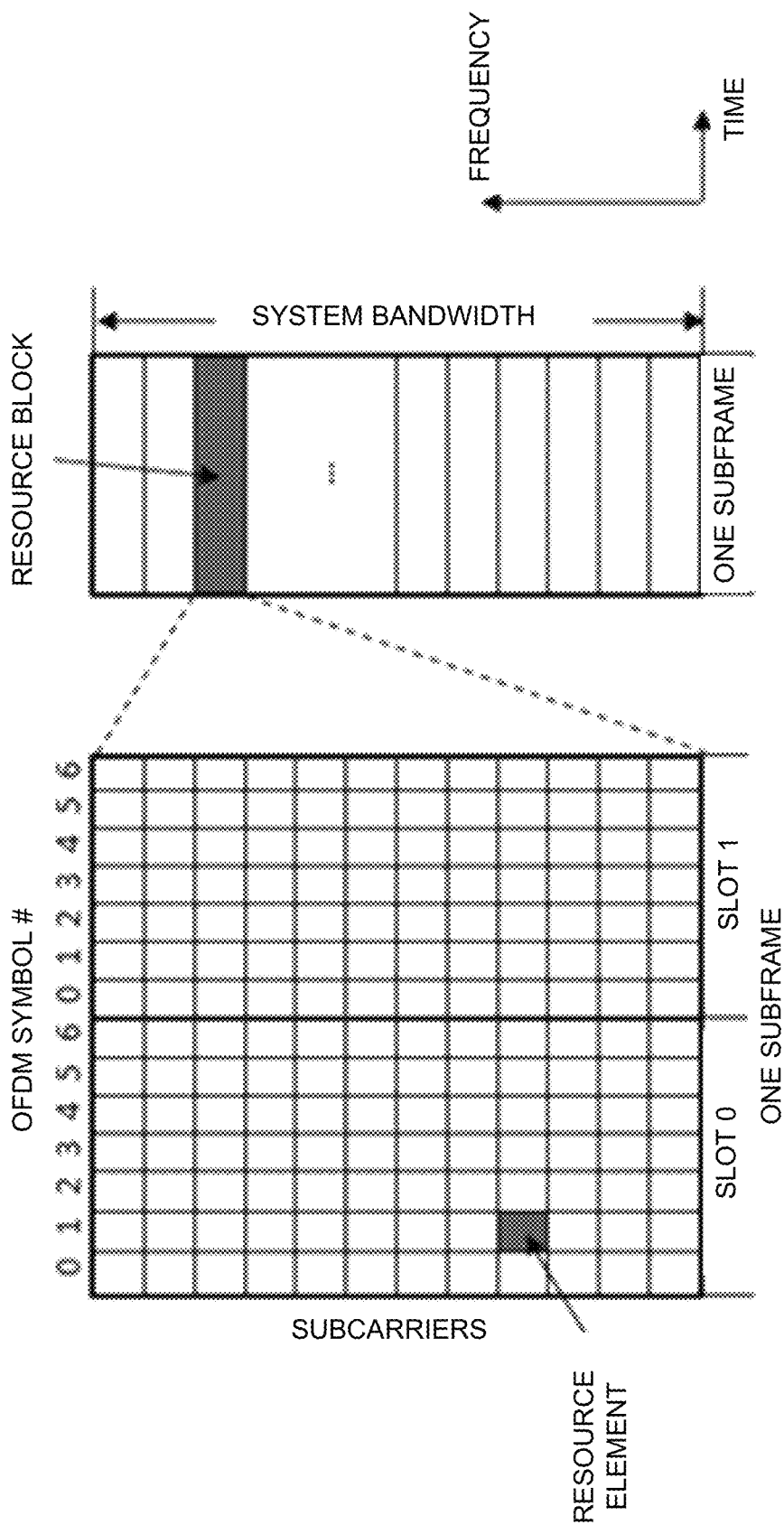
FIG. 1 depicts a portion of a conventional LTE time-frequency grid.
Figure 2:
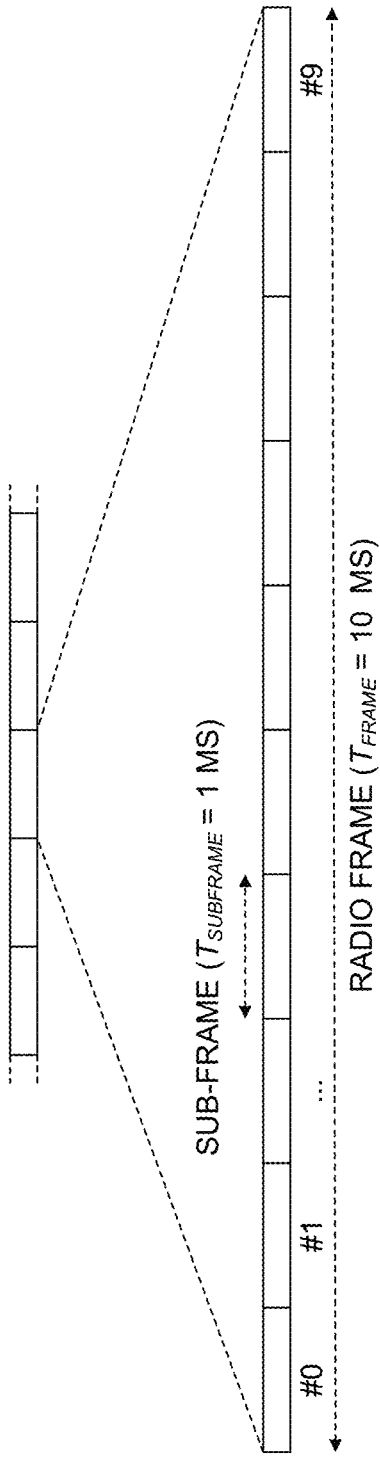
FIG. 2 illustrates a conventional LTE radio frame.
Figure 3:
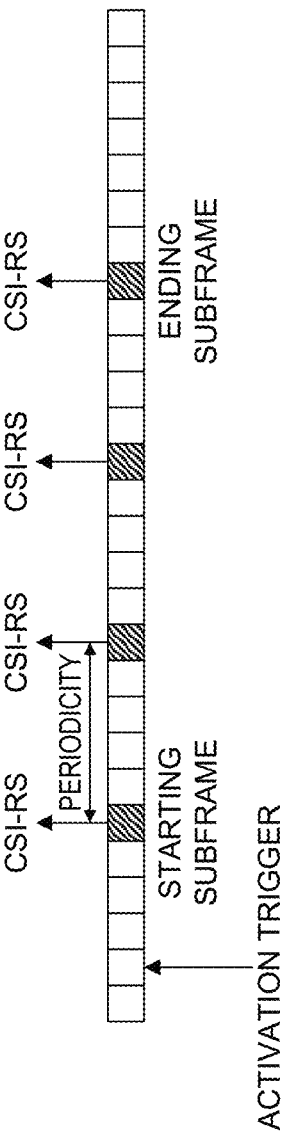
FIG. 3 illustrates an example of a Semi-Persistent CSI-RS transmission time period.
Figure 4:
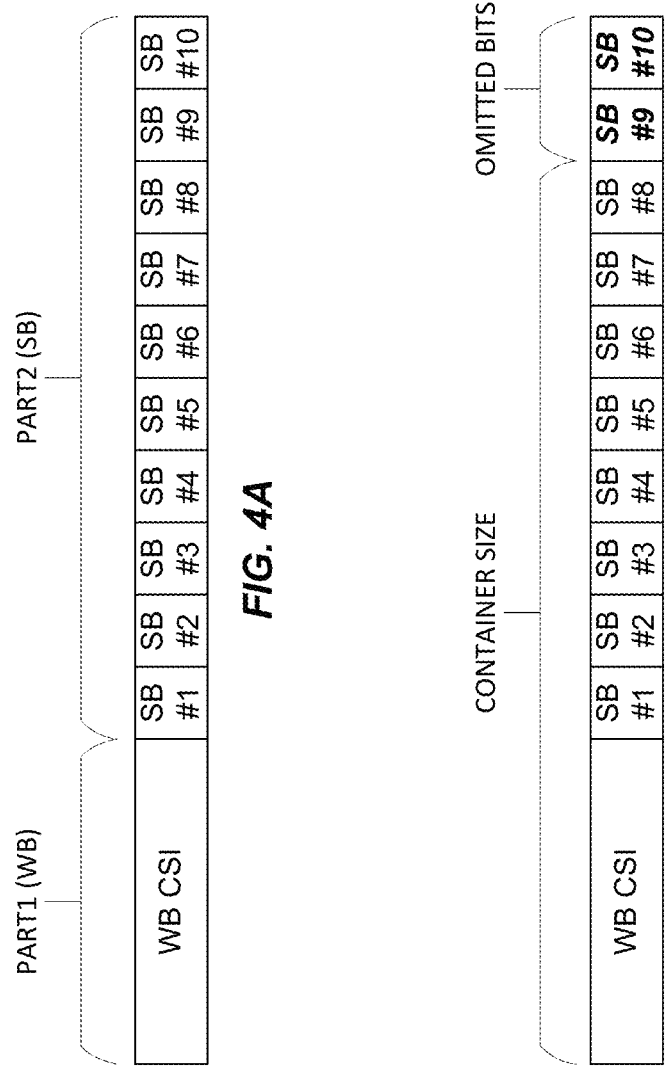
FIG. 4A depicts an example CSI that has been split into two parts.
FIG. 4B depicts an example scenario where a gNB has allocated insufficient resources for the CSI payload, resulting in omitted bits.
Figure 5:
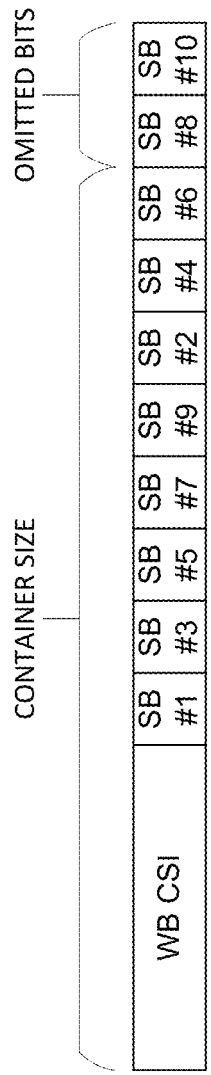
FIG. 5 illustrates ordering of CSI in UCI according to one embodiment of the subject matter described herein.
Figure 6:
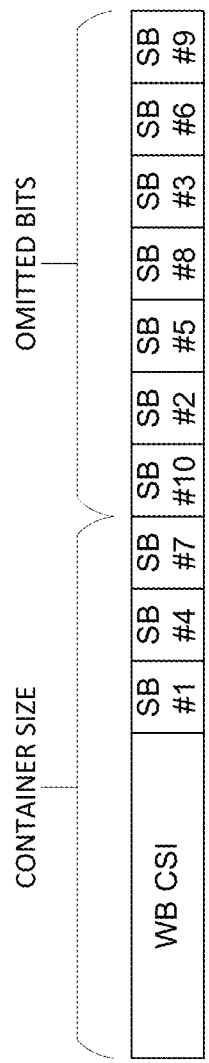
FIG. 6 illustrates ordering of CSI in UCI according to another embodiment of the subject matter described herein.

According to the disclosed method, subband based CSI omission is achieved by ordering the bits in the second CSI part in UCI in a certain fashion and then truncating the bitstream to only include the $O_{P2}$ most significant bits (MSBs). FIGS. 5 through 7 illustrate ordering of CSI in UCI according to various embodiments of the subject matter described herein.

In some embodiments, the CSI parameters/bits can be grouped in a wideband CSI part and a subband CSI part, where the WB CSI occupies the MSBs and the SB CSI occupies the LSBs. For example, the CSI may contain only PMI and the WB CSI may correspond to the codebook index (mapped to a number of bits) while the SB CSI may correspond to the codebook index $i_2$ (mapped to a number of bits).

The CSIs for the different subbands can then be mapped to bits in an order that does not correspond to increasing order of subband index. Instead, a per-subband interleaver is applied to map the SB CSIs to bits in an arbitrary order.

FIG. 5 illustrates ordering of CSI in UCI according to one embodiment of the subject matter described herein. In the embodiment illustrated in FIG. 5, the SB CSIs are interleaved so that odd subbands are mapped on the MSBs while even subbands are mapped to the LSBs. Thus, when truncating the LSBs, the odd subbands CSI will be omitted first, corresponding to dropping CSI on a size-2 comb. By dropping subband CSI in such a fashion, the actual loss in CSI accuracy may be small. Even if CSI for all the odd subband indices are omitted from the CSI report, the gNB can interpolate the SB CSI between the even subbands to attain an estimate of the CSI for the omitted subbands.

FIG. 6 illustrates ordering of CSI in UCI according to another embodiment of the subject matter described herein. In the embodiment illustrated in FIG. 6, the subbands are interleaved so that subbands with subband index $f$ such that $mod(f-1,3)=0$ are mapped to the MSBs, then $mod(f-1,3)=1$, and so forth, corresponding to omitting CSI on subbands on a size-3 comb.

In another embodiment, different interleavers are used depending on the ratio of CSI payload over container size. If the ratio is larger than a certain threshold, a first interleaver is used, while if the ratio is smaller than the certain threshold, a second interleaver is used. For example, the first interleaver may be the one illustrated in FIG. 5, while the second interleaver may be the one illustrated in FIG. 6. By using different interleavers for different ratios (corresponding to different percentages of omitted bits), the omitted CSI is spread out more evenly across the frequency band, which mitigates the CSI loss and allows for more reliable gNB interpolation across subbands.

In yet another embodiment, the per-subband interleaver may map subband CSIs where the corresponding subband CQI (which is reported in the first CSI part which has higher priority) have the largest value to the MSBs, the subband CSIs with the next largest subband CQI value to the subsequent bits, and so forth. In this case, SB CSI for the subbands with the worst CQI are mapped to the LSBs, implying that they will get omitted first if the PUSCH RA is too small to fit the entire CSI payload. Since the gNB may choose to only schedule the UE on its best subbands when operating with frequency-selective scheduling, the loss of SB CSI for the worst subbands may be low.

CSI from Multiple Cells or Multiple CSI Reports Multiplexed in Single UCI

In some embodiments, CSI from multiple cells and/or multiple CSI reports are multiplexed in a single UCI. In this case, the procedure can be a bit more complicated due to the fact that the different cells and/or reports can comprise a different number of subbands. One example of this is illustrated in FIG. 7A.

Figure 7A:
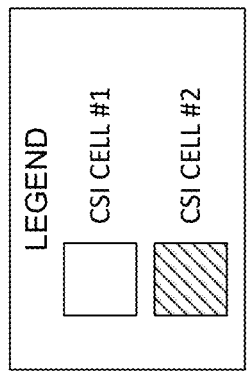
FIG. 7A illustrates ordering of CSI in UCI according to another embodiment of the subject matter described herein.

FIG. 7A illustrates ordering of CSI in UCI according to another embodiment of the subject matter described herein. In the embodiment illustrated in FIG. 7A, the CSI mapping for two cells is shown, where the first cell has 10 subbands while the second cell has 4 subbands.

In one embodiment, the WB CSIs for each cell/report are consecutively mapped to the MSBs of the second CSI part. The subband CSIs are then grouped per subband, so that subbands with the same (local) subband index of both cells are mapped to bits in consecutive order. The per-subband interleaving of CSI bits are then performed on the subband groups containing all cells/reports, meaning that no special consideration needs to be given for the case with multiple cells/reports.

Interleaving the CSI from multiple cells/reports in this fashion ensures that omitted CSI is spread out evenly across cells/reports, which causes less significant CSI errors than if the CSI for an entire cell/report would be omitted, as the gNB can interpolate the CSI between subbands.

One way of formalizing the previously discussed embodiment is as follows:
1. Identify the cell with the most subbands, $N_{SB}^{(max)}$
2. Create empty/dummy subbands on the cells with fewer subband than $N_{SB}^{(max)}$, so that all cells have the same number of subbands
3. Write the SB CSIs of each cell into a row of a matrix (as illustrated in Table 2, below)
4. Read out of the matrix by column according to the subband interleaving pattern
   a. In some embodiments, this may comprise reading columns with indices $k\Delta+l$, where $\Delta$ is an integer number of columns between adjacent column reads. The variable k is an integer counter identifying which column is to be read where $1 \leq k\Delta+l \leq N_{SB}^{max}$. The counter k starts with 1 and is incremented until $(k+1)\Delta+l$ would be greater than $N_{SB}^{max}$. When $(k+1)\Delta+l$ would be greater than $N_{SB}^{max}$, k is reset to 1. The variable l is also an integer counter identifying which column is to be read, but that varies more slowly than k. The counter l is set such that $l<\Delta$. The counter l starts with 0 and is incremented each time $(k+1)\Delta+l$ would be greater than $N_{SB}^{max}$. The counter k is no longer incremented, and the read out process is complete, when $(k+1)\Delta+l$ would be greater than $N_{SB}^{max}$ and when $l=\Delta-1$.
5. Drop the dummy subbands

TABLE 2

Illustration of writing subband CSI for different cells

|  | SB1 | SB2 | SB3 | SB4 | SB5 | SB6 | SB7 | SB8 | SB9 | SB10 |
| --- | --- | --- | --- | --- | --- | --- | --- | --- | --- | --- |
| Cell #1 | $i_2^{(1,1)}$ | $i_2^{(1,2)}$ | $i_2^{(1,3)}$ | $i_2^{(1,4)}$ | $i_2^{(1,5)}$ | $i_2^{(1,6)}$ | $i_2^{(1,7)}$ | $i_2^{(1,8)}$ | $i_2^{(1,9)}$ | $i_2^{(1,10)}$ |
| Cell #2 | $i_2^{(2,1)}$ | $i_2^{(2,2)}$ | $i_2^{(2,3)}$ | $i_2^{(2,4)}$ | Dummy | Dummy | Dummy | Dummy | Dummy | Dummy |

Figure 7B:
FIG. 7B illustrates a priority rule to omit partial subbands according to some embodiments described herein.

FIG. 7B illustrates a priority rule to omit partial subbands according to some embodiments described herein. In one embodiment, for NR CSI reporting on PUSCH, Part 2 information bits of partial subbands can be omitted. The priority rule illustrated in FIG. 7B supports the following priority rule to omit partial Part 2, where the priority level goes from high to low from Box #0 to Box #2N, and the omission granularity is one box in FIG. 7B. N is the number of CSI reports in one slot; the CSI report numbers correspond to the order in the CSI report configuration.

Figure 8:
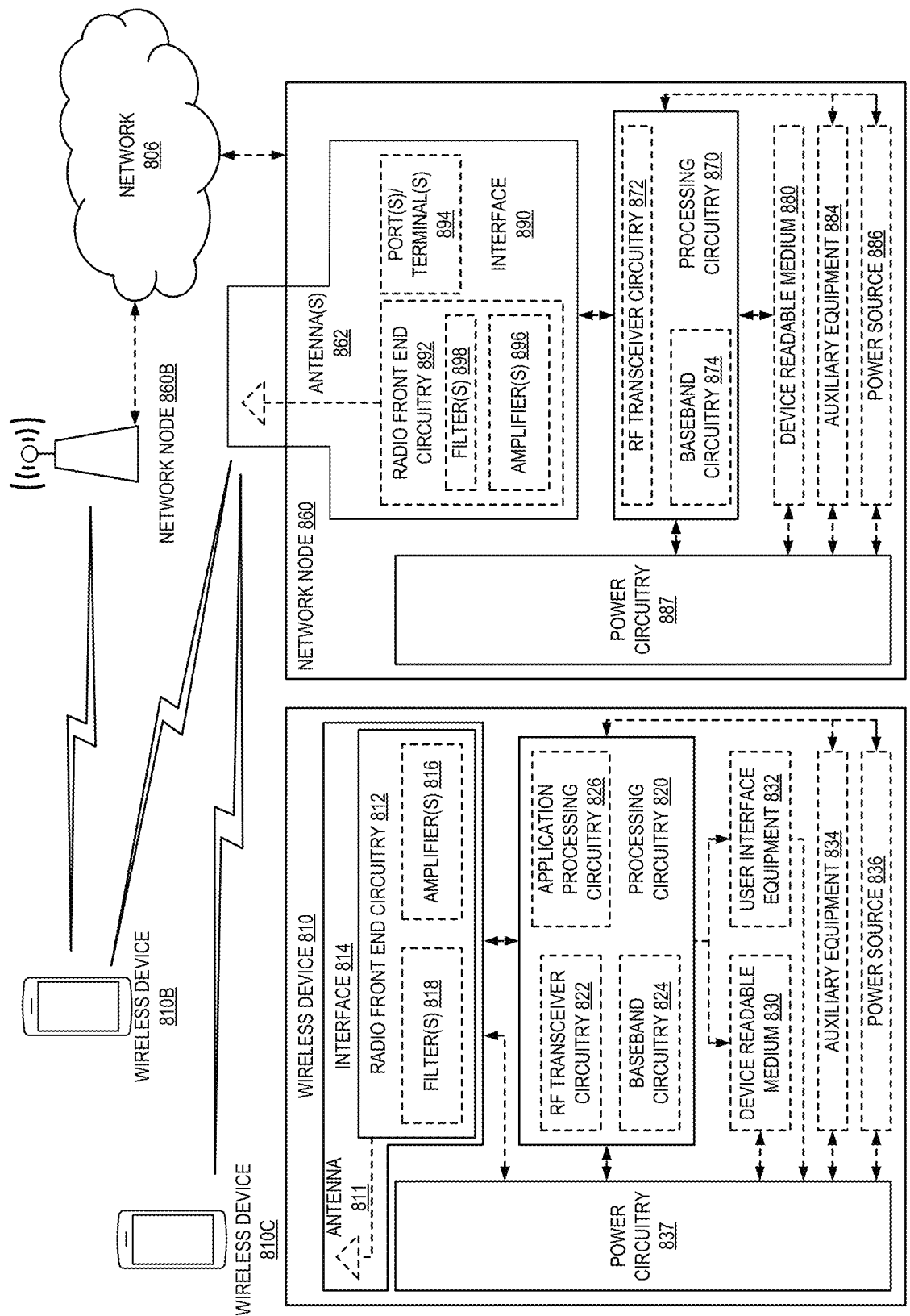
FIG. 8 illustrates a wireless network in accordance with some embodiments described herein.

Although the subject matter described herein may be implemented in any appropriate type of system using any suitable components, the embodiments disclosed herein are described in relation to a wireless network, such as the example wireless network illustrated in FIG. 8.

FIG. 8 illustrates a wireless network in accordance with some embodiments described herein. For simplicity, the wireless network of FIG. 8 only depicts network 806, network nodes 860 and 860*b*, and WDs 810, 810*b*, and 810*c*. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signalling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry

870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 814 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
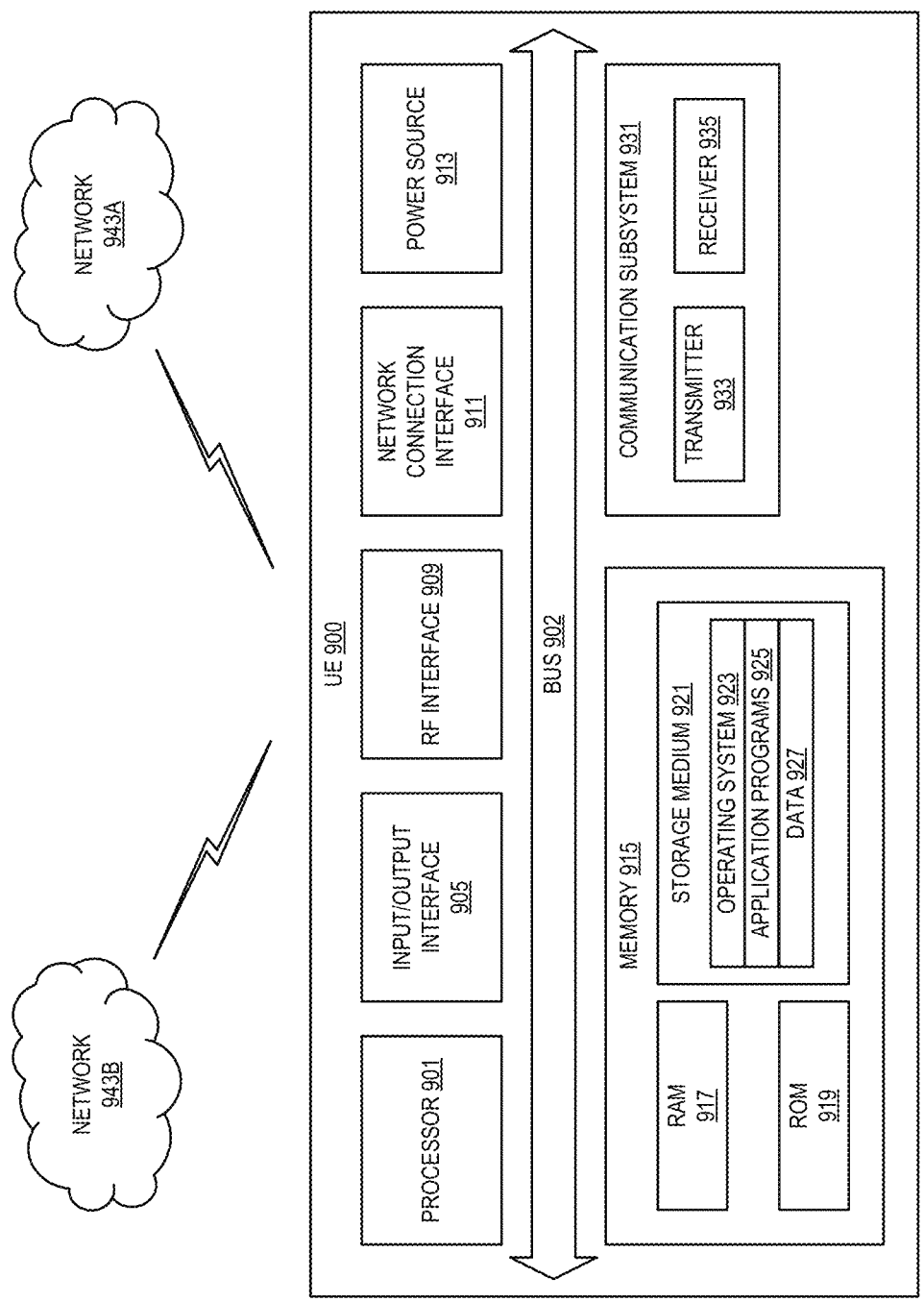
FIG. 9 illustrates a user equipment in accordance with some embodiments described herein.

FIG. 9 illustrates a user equipment in accordance with some embodiments described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 9200 may be any UE identified by the $3^{rd}$ Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943a. Network 943a may encompass wired and/or wireless networks such as a local-area network (LAN), a wide-area network (WAN), a computer network, a wireless network, a telecommunications network, another like network or any combination thereof. For example, network 943a may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943*b* using communication subsystem 931. Network 943*a* and network 943*b* may be the same network or networks or different network or networks. Communication subsystem 931 may be configured to include one or more transceivers used to communicate with network 943*b*. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.9, CDMA, WCDMA, GSM, LTE, UTRAN, WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943*b* may encompass wired and/or wireless networks such as a local-area network (LAN), a wide-area network (WAN), a computer network, a wireless network, a telecommunications network, another like network or any combination thereof. For example, network 943*b* may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
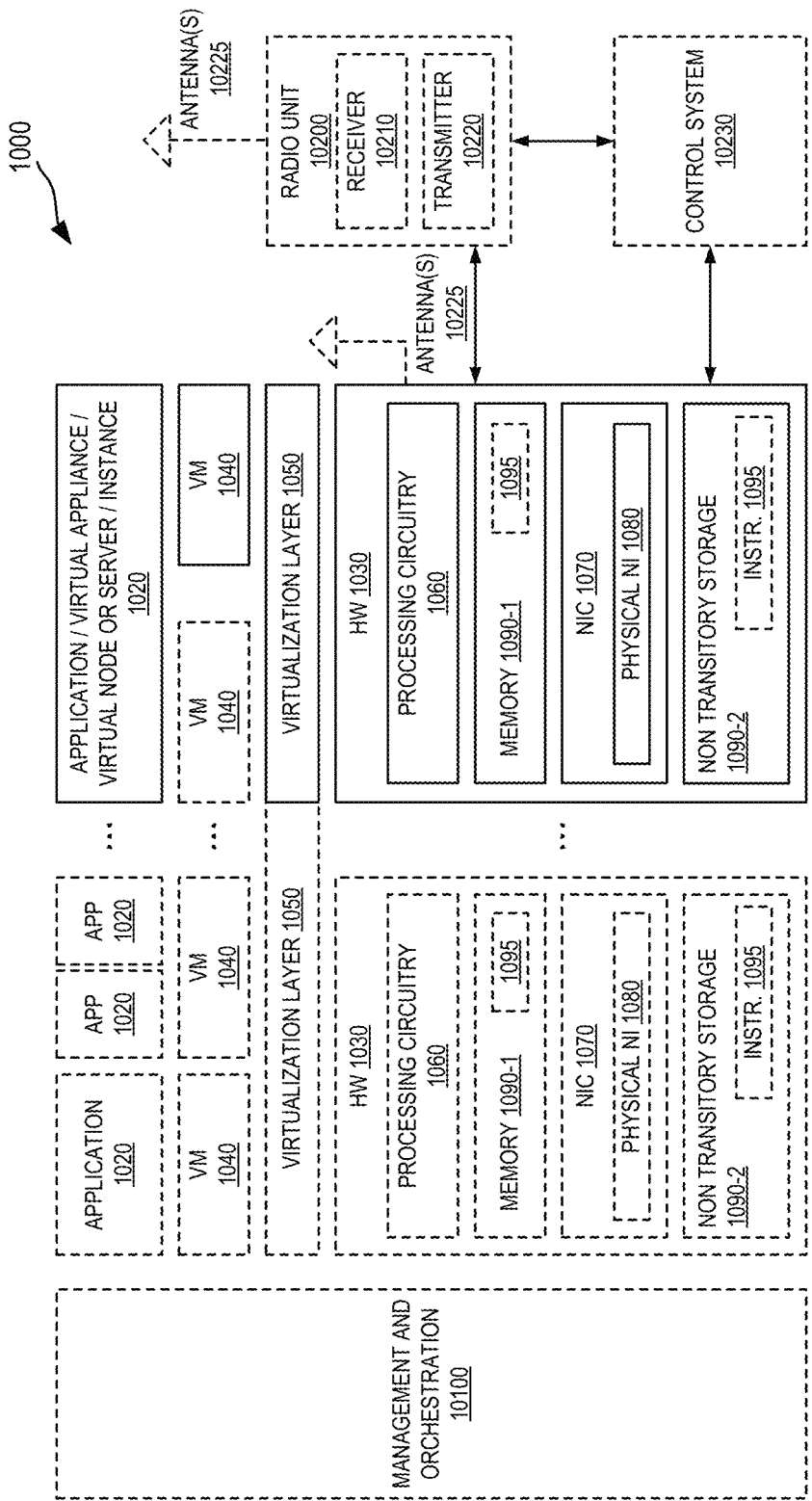
FIG. 10 is a schematic block diagram illustrating a virtualization in accordance with some embodiments described herein.

FIG. 10 is a schematic block diagram illustrating a virtualization in accordance with some embodiments described herein. FIG. 10 illustrates a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signalling can be effected with the use of control system 10230 which may alternatively be used for communication between the hardware nodes 1030 and radio units 10200.

Figure 11:
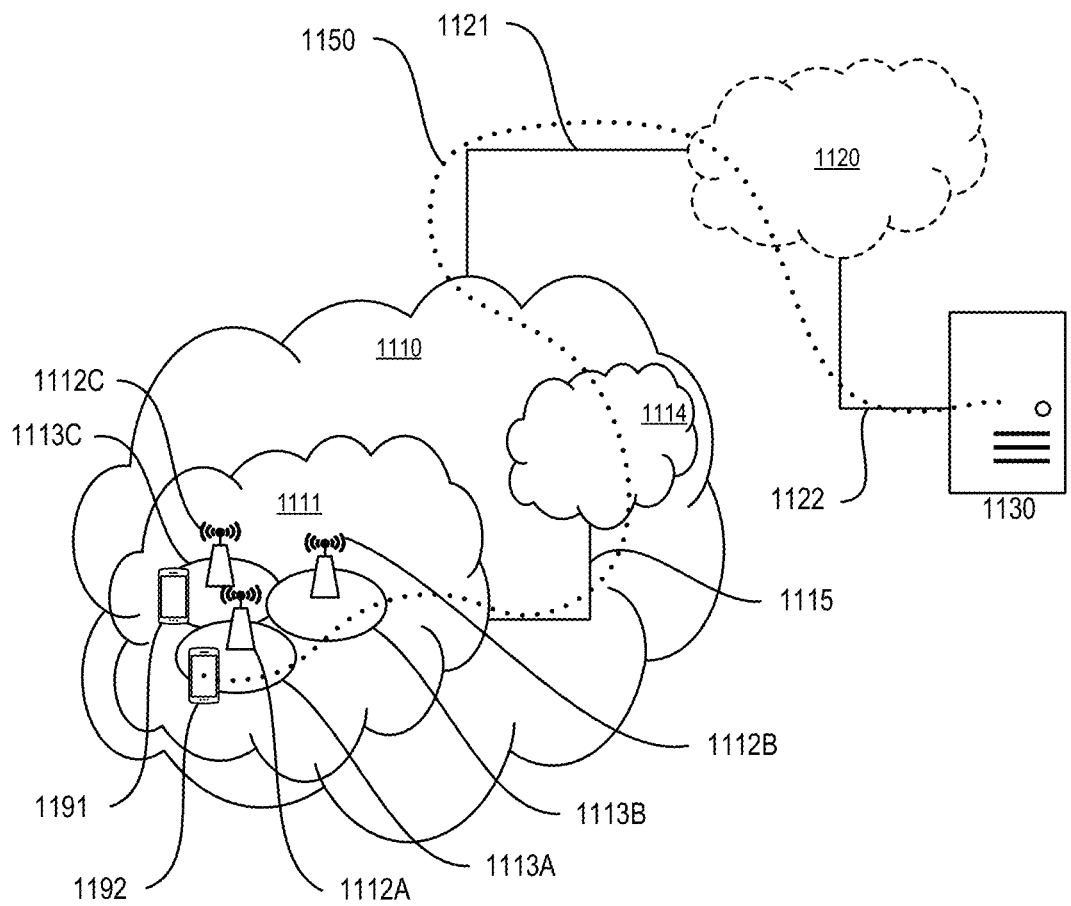
FIG. 11 is a schematic block diagram illustrating a telecommunication network connected via an intermediate network to a host computer in accordance with some embodiments described herein.

FIG. 11 is a schematic block diagram illustrating a telecommunication network connected via an intermediate network to a host computer in accordance with some embodiments described herein. With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12.

Figure 12:
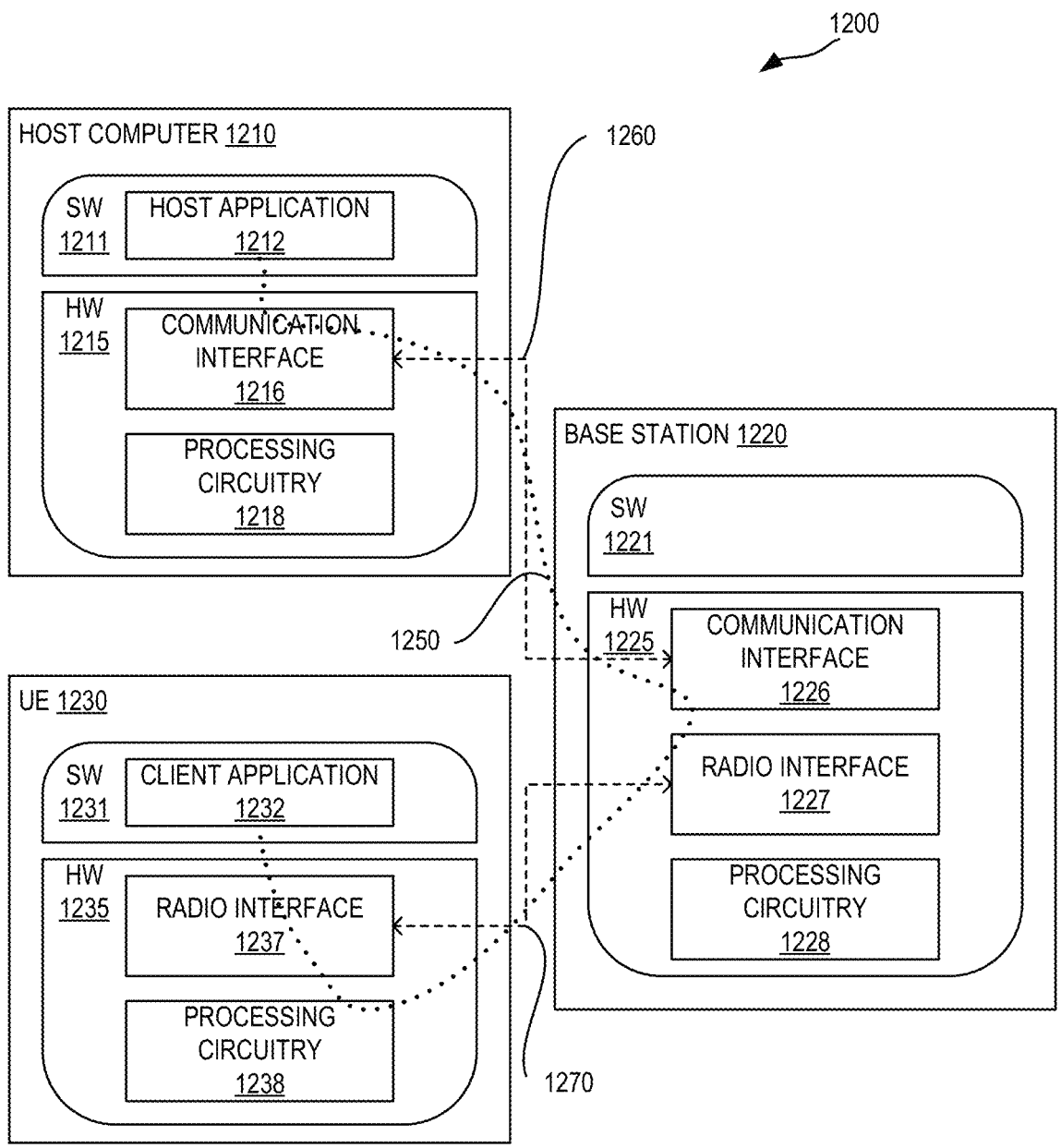
FIG. 12 is a generalized block diagram of a host computer communicating via a base station with a user equipment over a partially wireless connection in accordance with some embodiments described herein.

FIG. 12 is a generalized block diagram of a host computer communicating via a base station with a user equipment over a partially wireless connection in accordance with some embodiments described herein. In communication system 1200, host computer 1210 comprises hardware 1215 including communication interface 1216 configured to set up and maintain a wired or wireless connection with an interface of a different communication device of communication system

1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

It is noted that host computer 1210, base station 1220 and UE 1230 illustrated in FIG. 12 may be similar or identical to host computer 1130, one of base stations 1112a, 1112b, 1112c and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve CSI reporting under conditions where the CSI information to be reported exceeds the space allocated for CSI reports and thereby provide benefits such as improved calculation or estimation of actual channel conditions based on partial CSI information from the UE.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

Figures 13, 14:
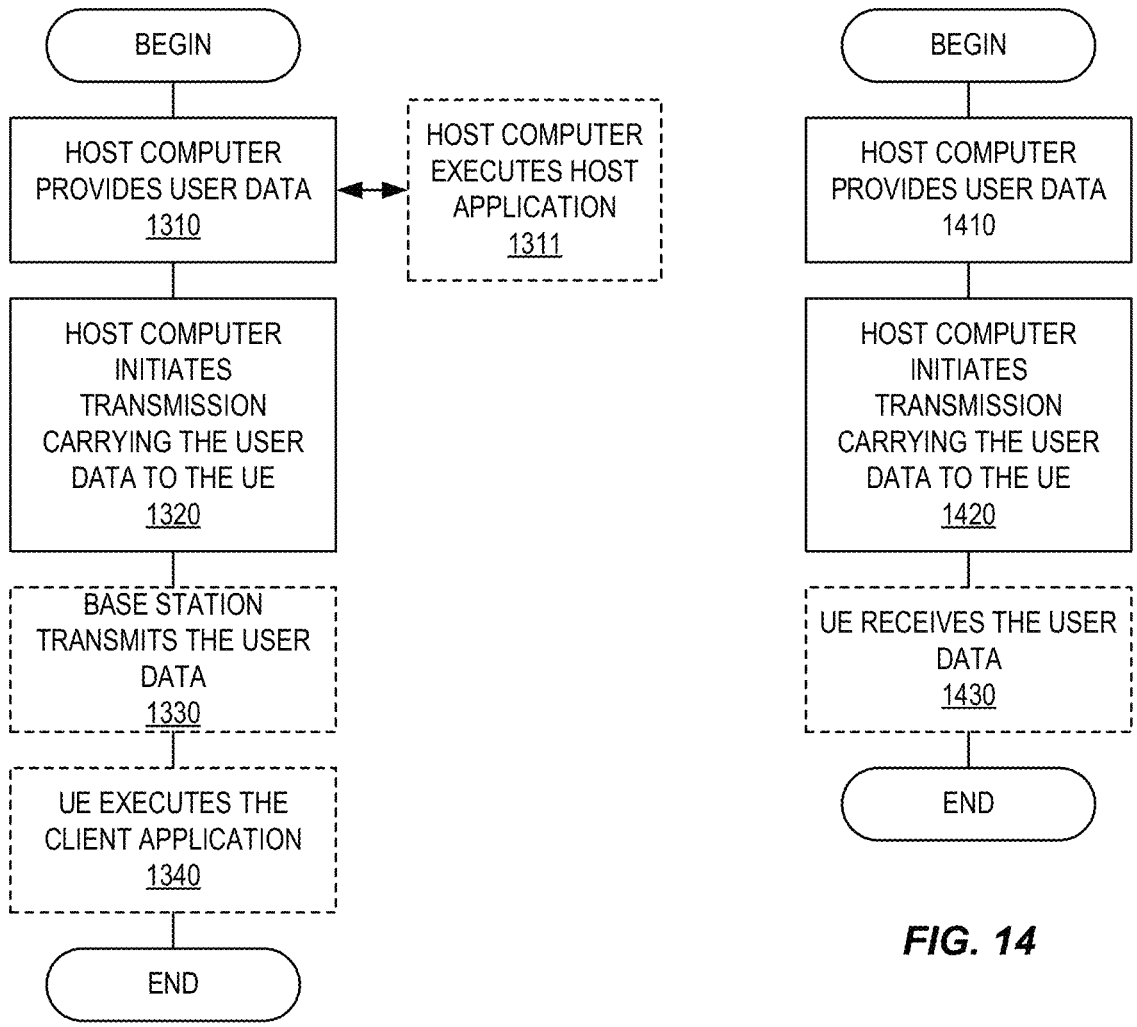
FIG. 13 is a flowchart illustrating methods implemented in a communication system including a host computer, a base station and a user equipment in accordance with some embodiments described herein.
FIG. 14 is a flowchart illustrating methods implemented in a communication system including a host computer, a base station and a user equipment in accordance with some embodiments described herein.

FIG. 13 is a flowchart illustrating methods implemented in a communication system including a host computer, a base station and a user equipment in accordance with some embodiments described herein. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

FIG. 14 is a flowchart illustrating methods implemented in a communication system including a host computer, a base station and a user equipment in accordance with some embodiments described herein. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

FIG. 15 is a flowchart illustrating methods implemented in a communication system including a host computer, a base station and a user equipment in accordance with some embodiments described herein. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

FIG. 16 is a flowchart illustrating methods implemented in a communication system including a host computer, a base station and a user equipment in accordance with some embodiments described herein. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 17:
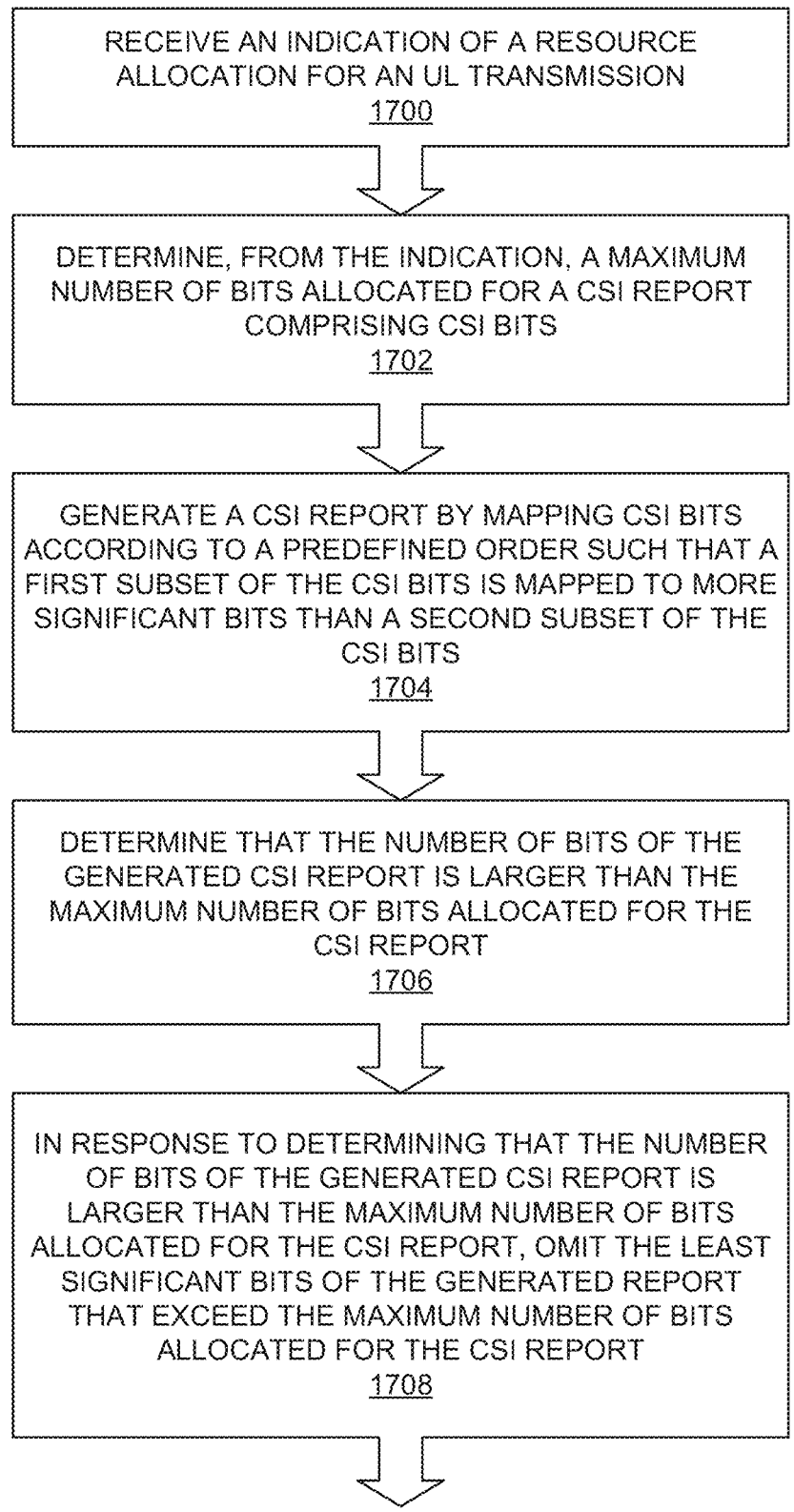
FIG. 17 depicts a method in accordance with some embodiments described herein.

FIG. 17 depicts a method in accordance with some embodiments described herein. In the embodiment illustrated in FIG. 17, the method includes: receiving an indication of a resource allocation for an UL transmission (step 1700); determining, from the indication, a maximum number of bits allocated for a CSI report comprising CSI bits (step 1702); generating a CSI report by mapping CSI bits according to a predefined order such that a first subset of the CSI bits is mapped to more significant bits than a second subset of the CSI bits (step 1704); determining that the number of bits of the generated CSI report is larger than the maximum number of bits allocated for the CSI report (step 1706); and, in response to determining that the number of bits of the generated CSI report is larger than the maximum number of bits allocated for the CSI report, omitting the least significant bits of the generated CSI report that that exceed the maximum number of bits allocated for the CSI report (step 1708).

Figure 18:
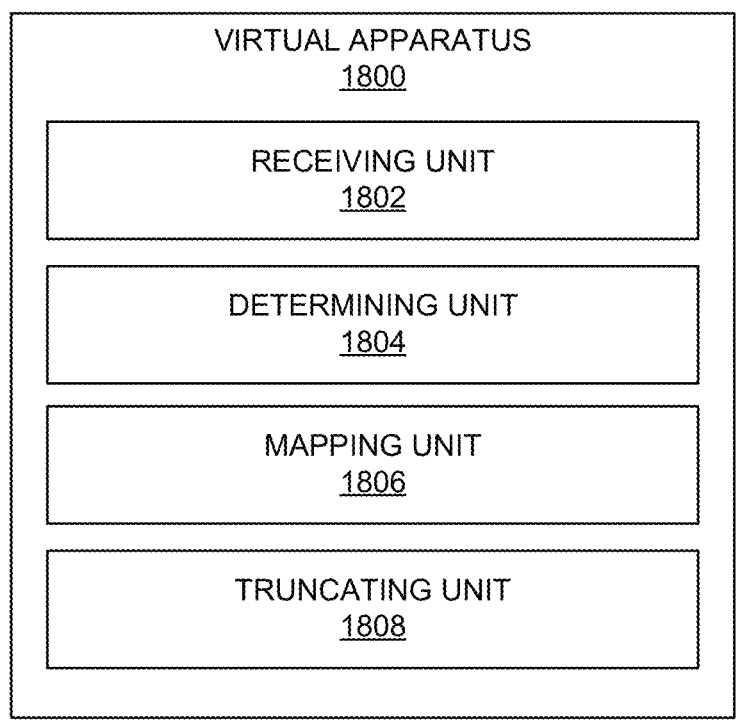
FIG. 18 illustrates a virtual apparatus in accordance with some embodiments described herein.

FIG. 18 illustrates a virtual apparatus in accordance with some embodiments described herein. FIG. 18 illustrates a schematic block diagram of an apparatus 1800 in a wireless network (for example, the wireless network shown in FIG. 8). The apparatus may be implemented in a wireless device or network node (e.g., wireless device 810 or network node 860 shown in FIG. 8). Apparatus 1800 is operable to carry out the example method described with reference to FIG. 17 and possibly any other processes or methods disclosed herein. It is also to be understood that the method of FIG. 17 is not necessarily carried out solely by apparatus 1800. At least some operations of the method can be performed by one or more other entities.

Virtual Apparatus 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

As illustrated in FIG. 18, apparatus 1800 includes a receiving unit 1802 for receiving an indication of a resource allocation for an UL transmission; a determining unit 1804 for determining, from the indication, a maximum number of bits allocated for a CSI report comprising CSI bits; a mapping unit 1806 for generating a CSI report by mapping CSI bits according to a predefined order such that a first subset of the CSI bits is mapped to more significant bits than a second subset of the CSI bits; and a truncating unit 1808 for determining that the number of bits of the generated CSI report is larger than the maximum number of bits allocated for the CSI report, and, in response to determining that the number of bits of the generated CSI report is larger than the maximum number of bits allocated for the CSI report, omitting the least significant bits of the generated CSI report that that exceed the maximum number of bits allocated for the CSI report.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

The following embodiments are illustrative and not limiting.

Group O Embodiments

1. A method performed in a wireless device for reporting channel state information (CSI), the method comprising at least one of: receiving an indication of a resource allocation for an UL transmission; determining, from the indication, a maximum container size for a CSI report; mapping the one or more information bits of a CSI report to a bitstream, optionally such that a first CSI subset is mapped to more significant bits than a second CSI subset; and omitting the one or more least significant bits of the bitstream, e.g. if the determined maximum container size is smaller than the size of the CSI report payload.

2. The method of embodiment 1 wherein the first and second CSI subsets correspond to separately encoded CSI parts.

3. The method of embodiment 2 wherein the CSI parts comprise at least a first and a second CSI type, wherein the first CSI type can contain at least one of a rank indication (RI) and a channel quality indication (CQI), and the second CSI type contains subband CSI parameters.

4. The method of embodiment 1 where the first CSI subset comprises wideband CSI parameters and the second CSI subset comprises subband CSI parameters.

5. The method of embodiment 4 wherein additionally the subband CSI parameters comprise CSIs for multiple subbands and the subbands are mapped to bits according to an interleaving pattern.

6. The method of embodiment 1 wherein the first CSI subset corresponds to subband CSIs for subbands with subband indices $f_1$ and the second CSI subset corresponds to subband CSIs for subbands with subband indices $f_2$ such that the remainder of $f_1/M$ is smaller than the remainder of $f_2/M$, for some integer M.

7. The method of any of embodiment 5 and 6 wherein subband CSI corresponding to one or more of different cells and different CSI reports with certain subband index are mapped to consecutive bits.

8. The method of embodiment 1 where the first CSI subset comprises wideband CSI for a plurality of cells, and the second CSI subset comprises subband CSI for the plurality of cells.

Group A Embodiments

9. A method performed in a wireless device for reporting Channel State Information (CSI), the method comprising at least one of: receiving an indication of a resource allocation for an UL transmission; determining, from the indication, a maximum number of bits allocated for a CSI report comprising CSI bits; generating a CSI report by mapping CSI bits according to a predefined order such that a first subset of the CSI bits is mapped to more significant bits than a second subset of the CSI bits; determining that the number of bits of the generated CSI report is larger than the maximum number of bits allocated for the CSI report; and in response to determining that the number of bits of the generated CSI report is larger than the maximum number of bits allocated for the CSI report, omitting the least significant bits of the generated CSI report that that exceed the maximum number of bits allocated for the CSI report.

10. The method of embodiment 9 wherein the first CSI subset and the second CSI subset correspond to separately encoded CSI parts.

11. The method of embodiment 10 wherein the CSI parts comprise at least a first CSI type and a second CSI type, wherein the first CSI type can contain at least one of a rank indication (RI) and a channel quality indication (CQI), and the second CSI type contains subband CSI parameters.

12. The method of any of embodiments 9-11 wherein the first CSI subset comprises wideband CSI parameters and the second CSI subset comprises subband CSI parameters.

13. The method of any of embodiments 9-12 wherein the subband CSI parameters comprise CSIs for multiple subbands and wherein the subbands are mapped to bits according to an interleaving pattern.

14. The method of embodiment 12-13 wherein the first CSI subset corresponds to subband CSIs for subbands with subband indices $f_1$ and the second CSI subset corresponds to subband CSIs for subbands with subband indices $f_2$ such that the remainder of $f_1/M$ is smaller than the remainder of $f_2/M$, for some integer M.

15. The method of any of embodiments 12-15 wherein subband CSI corresponding to one or more of different cells and different CSI reports with certain subband index are mapped to consecutive bits.

16. The method of any of embodiments 9-15 wherein the first CSI subset comprises wideband CSI for a plurality of cells, and the second CSI subset comprises subband CSI for the plurality of cells.

Group B Embodiments

17. A method performed in a base station for receiving Channel State Information (CSI) from a UE, the method comprising: sending, to the UE an indication of a resource allocation for an UL transmission; and receiving, from the UE, a CSI report comprising CSI bits that have been mapped according to a predefined order such that a first subset of the CSI bits is mapped to more significant bits than a second subset of the CSI bits.

Group C Embodiments

18. A wireless device for reporting Channel State Information (CSI), the wireless device comprising: processing circuitry configured to perform any of the steps of any of the Group A or O embodiments; and power supply circuitry configured to supply power to the wireless device.

19. A user equipment (UE) for reporting Channel State Information (CSI), the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A or O embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

20. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

21. The communication system of the pervious embodiment further including the base station.

22. The communication system of the previous 2 embodiments, further including the UE, wherein the UE is configured to communicate with the base station.

23. The communication system of the previous 3 embodiments, wherein: the processing circuitry of the host computer is configured to execute a host application, thereby providing the user data; and the UE comprises processing circuitry configured to execute a client application associated with the host application.

24. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the Group B embodiments.

25. The method of the previous embodiment, further comprising, at the base station, transmitting the user data.

26. The method of the previous 2 embodiments, wherein the user data is provided at the host computer by executing a host application, the method further comprising, at the UE, executing a client application associated with the host application.

27. A user equipment (UE) configured to communicate with a base station, the UE comprising a radio interface and processing circuitry configured to performs the of the previous 3 embodiments.

28. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A or O embodiments.

29. The communication system of the previous embodiment, wherein the cellular network further includes a base station configured to communicate with the UE.

30. The communication system of the previous 2 embodiments, wherein: the processing circuitry of the host computer is configured to execute a host application, thereby providing the user data; and the UE's processing circuitry is configured to execute a client application associated with the host application.

31. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the Group A or O embodiments.

32. The method of the previous embodiment, further comprising at the UE, receiving the user data from the base station.

33. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of the Group A or O embodiments.

34. The communication system of the previous embodiment, further including the UE.

35. The communication system of the previous 2 embodiments, further including the base station, wherein the base station comprises a radio interface configured to communicate with the UE and a communication interface configured to forward to the host computer the user data carried by a transmission from the UE to the base station.

36. The communication system of the previous 3 embodiments, wherein: the processing circuitry of the host computer is configured to execute a host application; and the UE's processing circuitry is configured to execute a client application associated with the host application, thereby providing the user data.

37. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

38. A method implemented in a communication system including a host computer, a base station and a user equipment (UE), the method comprising: at the host computer, receiving user data transmitted to the base station from the UE, wherein the UE performs any of the steps of any of the Group A or O embodiments.

39. The method of the previous embodiment, further comprising, at the UE, providing the user data to the base station.

40. The method of the previous 2 embodiments, further comprising: at the UE, executing a client application, thereby providing the user data to be transmitted; and at the host computer, executing a host application associated with the client application.

41. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

42. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

43. The communication system of the previous embodiment further including the base station.

44. The communication system of the previous 2 embodiments, further including the UE, wherein the UE is configured to communicate with the base station.

45. The communication system of the previous 3 embodiments, wherein: the processing circuitry of the host computer is configured to execute a host application; the UE is configured to execute a client application associated with the host application, thereby providing the user data to be received by the host computer.

46. A method implemented in a communication system including a host computer, a base station and a user equipment (UE), the method comprising: at the host computer, receiving, from the base station, user data originating from a transmission which the base station has received from the UE, wherein the UE performs any of the steps of any of the Group A or O embodiments.

47. The method of the previous embodiment, further comprising at the base station, receiving the user data from the UE.

48. The method of the previous 2 embodiments, further comprising at the base station, initiating a transmission of the received user data to the host computer.

ADDITIONAL INFORMATION

In RAN1-NRAH3, many open issues regarding CSI reporting were resolved by agreeing the WF R1-1716901, the contents of which are summarized below:

Begin Summary

UCI multiplexing/encoding:
  Short PUCCH: Joint encoding of CRI/RI/PMI/CQI with constant UCI size, details determined in the channel coding session
  Long PUCCH: For WB CSI, use method for short PUCCH, for SB CSI, use method for PUSCH
  PUSCH: For Type II, use 2-part encoding, where $1^{st}$ part contains RI, CQI and indication of the number of non-zero wideband amplitude coefficients per layer
    Open issue #1: How to encode RI and the indication of the number of non-zero wideband amplitude coefficients
UCI priority rules:
  Parts of CSI report on PUSCH carrying UL-SCH can be omitted if UCI size is bigger than container size, subband PMI of certain subbands can be omitted
  Open issue #2: Define exact UCI priority rule
CSI Reporting modes:
  Partial Type II report on long PUCCH
  Either a long or short PUCCH resource can be configured to carry PUCCH-based CSI report
  SP-CSI on PUSCH supported using similar mechanism to LTE SPS
    Open issue #3: Detailed triggering mechanism for SP-CSI on PUSCH
    Open issue #4: If SP-CSI on short/long PUCCH is also supported
  A-CSI on short PUCCH using higher-layer PUCCH resource configuration and DCI-based triggering Working assumption for Y>0
    Open issue #5: Details on triggering A-CSI on PUCCH
Subband size: A subband is N contiguous PRBs, value of N depends on size of active BWP, FFS values
  Open issue #6: Determine subband sizes
Frequency-granularities:
  CSI reporting band is configured in CSI report setting to be contiguous or non-contiguous subset of subbands in BWP
    Open issue #7: Possible restrictions on CSI reporting band definition
  WB/SB PMI/CQI reporting can be configured in CSI report setting
Hybrid CSI reporting: i2 and CQI can be omitted from WB CSI report
Semi-open loop: i2 can be omitted from CSI report, UE assumes random i2 across PRGs when calculating CQI
Type II codebook details:
  L-beam selection is jointly encoded
  If WB amplitude coefficient is zero, corresponding SB coefficients are not reported
Codebook subset restriction (CBSR)
  Type II: Joint beam and amplitude restriction based on two-level beam grouping
  Type I SP: Rank 3&4 CBSR restrict beams based on bitmap for other ranks
    Open issue #7: Detailed CBSR scheme
  Type I MP: Only DFT beam restriction
  CBSR do not impact PMI payload
  CBSR for 2TX codebook using bitmap Another open issue (#8) is what periodicities shall be allowed for P/SP-CSI reporting and what triggering offsets (open issue #9) shall be allowed for A-CSI reporting. In this contribution, we discuss the remaining open issues in CSI reporting.

Open Issue #1: How to Encode First Part of Type II Report

According to the agreement in RAN1 #90-AH3, Type II CSI is segmented in two parts, where the first part contains RI, CQI and an indication of the number of non-zero wideband amplitude coefficients per layer. Based on gNB decoding of the first part, the payload size of the second part, which contains remaining PMI, is known and can be decoded. Since uneven quantization of subband coefficients is used in Type II codebook, where the K strongest coefficients per layer are quantized using full resolution, and the remaining coefficients are quantized using coarser resolution, information about the number of non-zero coefficients must be given per layer in order to resolve payload ambiguity.

The number of non-zero WB amplitude coefficients per layer l can be expressed as $N_{NCZ}^{(l)}=1, \ldots, 2L$, which thus require $\lceil \log_2 2L \rceil$ bits. As the payload size of the first CSI part must be constant to avoid blind decoding at the gNB, both $N_{NZC}^{(0)}$ and $N_{NZC}^{(1)}$ must be present, regardless if RI=1 or RI=2.

Two options exist for encoding RI, $N_{NZC}^{(0)}$ and $N_{NZC}^{(1)}$:

Separate fields: Each field is encoded separately, this require $1+2\lceil \log_2 2L \rceil$ bits Joint field: The three parameters are mapped to a single index, as exemplified in Table 3. This approach requires $\lceil \log_2(4L^2+2L) \rceil$ bits

TABLE 3

Example of joint indexing for L = 2

| Joint index | RI | $N_{NZC}^{(0)}$ | $N_{NZC}^{(1)}$ |
|---|---|---|---|
| 0 | 1 | 4 | — |
| 1 | 1 | 3 | — |
| 2 | 1 | 2 | — |
| 3 | 1 | 1 | — |
| 4 | 2 | 4 | 4 |
| 5 | 2 | 3 | 3 |
| ... | ... | ... | ... |
| 19 | 2 | 1 | 1 |

The joint encoding has the potential for reducing feedback overhead at the cost of a more complicated specification. However, as can be seen in Table 4 below, joint encoding only saves 1 bit in the case of L=3 and costs equally many bits as the separate encoding scheme for L=2,4. Therefore, joint encoding does not seem motivated, especially considering the comparably much larger feedback overhead for CSI part 2.

TABLE 4

Feedback overhead for RI, $N_{NZC}^{(0)}$ and $N_{NZC}^{(1)}$

| Scheme | L = 2 | L = 3 | L = 4 |
|---|---|---|---|
| Separate fields | 5 bits | 7 bits | 7 bits |
| Joint field | 5 bits | 6 bits | 7 bits |

| | |
|---|---|
| Observation 1 | Joint encoding of RI, $N_{NZC}^{(0)}$ and $N_{NZC}^{(1)}$ only saves 1 bit for one possible value of the number of beams L, while it increases specification and implementation complexity |
| Proposal 1 | In the first part of a Type II CSI report, RI, $N_{NZC}^{(0)}$ and $N_{NZC}^{(1)}$ are mapped to independent fields in TS 38.212 |

Open Issue #2: Define Exact UCI Priority Rule

In RAN1 #90-AH it was agreed that the two separately encoded parts of a CSI report on PUSCH carrying UL-SCH have different transmission priorities, where Part 1 has higher priority than Part 2. The motivation is to introduce a mechanism do deal with the problem when PUSCH RA is too small to fit the UCI payload, for instance when Type II CSI is used and the UE reports RI=2 while the gNB has only allocated PUSCH resources assuming RI=1 payload size, or, when Type I CSI for multiple cells in a CA scenario is transmitted where the variation of PMI/CQI payload depending on UE's selection of CRI/RI can be large.

It has been agreed that information bits and/or channel coded bits of part 2 can be partially transmitted, but the exact scheme still needs to be specified:

Omit CSI parameters corresponding to at least one subbands for part 2

TBD by RAN1 #90bis: if all of part 2 can be dropped as a special case

TBD by RAN1 #90bis: specify one of the following omission rules:

Omitted subbands are determined based on a decimation ratio and/or a priority pattern used to order subband CSI (defined in specification)

Omitted subbands are determined based on the measured subband CQI included in part 1

Regardless of what omission rules is agreed, the same basic mechanism can be used to determine which information bits shall be omitted from the CSI report. Based on the PUSCH resource allocation, the number of available REs for UCI $Q_{UCI}$ is known (whether $Q_{UCI}$ corresponds to all the REs in to PUSCH RA or a subset of the REs is not yet decided and does not matter for the subsequent reasoning). The number of REs available for the second CSI part can then be calculated as $Q_{P2}=Q_{UCI}-Q_{P1}-Q_{ACK}$, where $Q_{P1}$ is the number of REs for the first CSI part and $Q_{ACK}$ is the number of REs for HARQ-ACK. The total number of information bits that are available for the second CSI part may then be calculated as $$O_{P2} = \left\lfloor \frac{Q_{P2}Q_m}{\beta_{P2}} \right\rfloor,$$

where $\beta_{P2}$ is an integer controlling the code rate of the second CSI part. If the number of information bits actually contained in the second CSI part, $O_{P2}'>O_{P2}'$ the overflowing bits $\tilde{O}_{P2}=O_{P2}'-O_{P2}$ must be omitted.

A simple way of achieving subband based omission is to order the bits in the second CSI part in UCI in a certain fashion and then simply truncate the bitstream to only include the $O_{P2}$ most significant bits (MSBs). For instance, the CSI parameters/bits can be grouped in a wideband CSI part and a subband CSI part, where the WB CSI occupies the MSBs and the SB CSI occupies the LSBs. The CSIs for the different subbands can then be mapped to bits in an order that does not correspond to increasing order of subband index. Instead, a per-subband interleaver can be applied to map the SB CSIs to bits in an arbitrary order. An example of this is given in FIG. 19.

FIGS. 5 and 6 illustrate a per-subband interleaver applied to map the SB CSIs to bits in an arbitrary order in accordance with some embodiments described herein. In the middle example, the SB CSIs are interleaved so that odd subbands are mapped on the MSBs while even subbands are mapped to the LSBs. Thus, when truncating the LSBs, the odd subbands CSI will be omitted first, corresponding to dropping CSI on a size-2 comb. In the bottom example in the figure, the subbands are interleaved so that subbands with subband index $f$ such that mod($f-1,3$)=0 are mapped to the MSBs, then mod($f-1,3$)=1, and so forth, corresponding to omitting CSI on subbands on a size-3 comb.

To implement CSI dropping of the worst subbands, the per-subband interleaver could map subband CSIs where the corresponding subband CQI have the largest value to the MSBs, the subband CSIs with the next largest subband CQI value to the subsequent bits, and so forth.

| | |
|---|---|
| Observation 2 | Omission of SB CSI can generally be implemented by ordering the UCI bits such that SB CSI are mapped to the LSBs in the UCI and interleaving CSI bits on a per-subband basis |
| Proposal 2 | When UCI containing CSI is carried on PUSCH, UCI bits in the second CSI part are ordered so that WB CSI parameters are mapped to the MSBs while subband CSI parameters are mapped to the LSBs |
| Proposal 3 | Per-subband CSI parameters are interleaved according to a pre-defined pattern |
| Proposal 4 | If the number of UCI bits are larger than the number of available bits for UCI, the LSBs are truncated |

From the above proposal, it follows that the entire second CSI part can be dropped if the PUSCH RA is small enough, however that case is not likely to happen.

For UCI containing single-cell single-report CSI, it is fairly straightforward to define an interleaving pattern changing the subband ordering. However, in the case of multiple cells and/or multiple CSI reports multiplexed in a single UCI, the procedure can be a bit more complicated due to the fact that the different cells and/or reports can include different number of subbands. A simple solution is illustrated in FIG. 20.

FIG. 7A illustrates subband interleaving when CSI for two cells are multiplexed in UCI in accordance with some embodiments described herein, where the CSI mapping for two cells is shown, were the first cell has 10 subbands while the second cell has 4 subbands. The WB CSIs for each cell/report are consecutively mapped to the MSBs of the second CSI part. The subband CSIs are then grouped per subband, so that subbands with the same (local) subband index of both cells are mapped to bits in consecutive order. The per-subband interleaving of CSI bits are then performed on the subband groups containing all cells/reports, meaning that no special consideration needs to be given for the case with multiple cells/reports.

Interleaving the CSI from multiple cells/reports in this fashion ensures that omitted CSI is spread out evenly across cells/reports, which causes less significant CSI errors than if the CSI for an entire cell/report would be omitted, as the gNB can interpolate the CSI between subbands.

| | |
|---|---|
| Proposal 5 | When CSI from multiple cells and/or multiple CSI reports are multiplexed in UCI on PUSCH, the following bit ordering is applied in the second CSI part:<br>The WB CSIs for each cell/report are consecutively mapped to the MSBs of the second CSI part. |
| Proposal 6 | The SB CSIs of the multiple cells/reports are grouped per subband and interleaved according to a pre-defined pattern |

It can be discussed what kind of interleaving pattern shall be applied. One option is to adapt the interleaving pattern to the amount of CSI that needs to be omitted. For instance, subbands can be dropped on a size-2 comb when the ratio between the container size and the number of UCI bits exceeds one threshold and subbands can be dropped on a size-3 comb when the ratio is smaller than another threshold. However, using multiple interleaving patterns can complicate implementation. As mismatch between PUSCH RA and UCI size is not likely to happen that often in a proper implementation, it does not make sense to over-optimize the mechanism and therefore a single interleaving pattern can be defined.

| | |
|---|---|
| Proposal 7 | The following subband interleaving pattern is used for UCI bit mapping: SB CSI corresponding to odd subband indices are mapped to the MSBs and SB CSI corresponding to even subband indices are mapped to the LSBs, in increasing subband index order |

Open Issue #3: Detailed Triggering Mechanism for SP-CSI on PUSCH

Details of SP-CSI on PUSCH: <none>.

Open Issue #5: Details on Triggering A-CSI on PUCCH

It was agreed to support aperiodic CSI reporting on short PUCCH in RAN1 #90-AH3. One motivation for this is to allow for more scheduling flexibility, even WB CSIs can be triggered aperiodically and it can be wasteful to spend an entire PUSCH transmission (spanning multiple OFDM symbols) if only transmitting a couple of 10 bits of WB CSI. Another motivation is to allow for same-slot CSI feedback (i.e. Y=0).

Obviously, an A-CSI report must be triggered with DCI by indicating which CSI report(s) shall be reported in the CSI request field. Traditionally, the CSI request field is present in UL-related DCI, as the CSI report in that case is multiplexed with UL-SCH on PUSCH and the UL-related DCI contains the PUSCH RA. However, when the A-CSI report is transmitted on PUCCH, it makes more sense to include a CSI request field in DL-related DCI. Firstly, for the case same-slot CSI reporting (Y=0), the UE is likely being scheduled with PDSCH in the same slot as it is triggered with an immediate CSI report (otherwise, there is no benefit with immediate reporting). Thus, if the CSI request field is not present in the DL-related DCI containing the DL grant, both a UL-related and DL-related DCI would need to be transmitted in the same slot. Secondly, the DL-related DCI already contains a PUCCH resource indicator field for HARQ-ACK, indicating the timing offset and frequency/code location of the PUCCH containing ACK/NACK. This field can be re-used for indicating the PUCCH resource for A-CSI.

| | |
|---|---|
| Observation 3 | Triggering of A-CSI on PUCCH must be done with DL-related DCI |

The simplest approach would be to always piggyback the A-CSI report on the same PUCCH that is used to transmit the HARQ-ACK. However, this would limit the flexibility for the gNB. It can also be wasteful in terms of UL resources. As HARQ-ACK is only a few bits, while WB CSI can be on the order of 20 bits, different frequency-allocations and/or PUCCH formats could be required depending on if "HARQ-ACK only" or "HARQ-ACK+CSI" are multiplexed in the PUCCH. Furthermore, it could potentially be beneficial to transmit the HARQ-ACK and CSI that was triggered with the same DCI on different PUCCH resources.

For instance, a CSI report with many antenna ports could be triggered, requiring some CSI process delay by the UE so that the CSI report is transmitted in e.g. slot n+2, while the ACK/NACK could be transmitted in slot n. Thus, different PUCCH timing offsets would need to be indicated. Such flexibility can be introduced without increasing DCI overhead. The PUCCH resource indicator field can simply be interpreted differently depending on the presence of DL grant and/or CSI request in the DCI. This is illustrated in Table 5 below. In this example, if bits 00 are indicated, PUCCH resource #1 is used if the DCI contains DL grant only and not a CSI request while PUCCH resource #3 is used if DCI contains CSI request only and no DL grant. If DCI contains both DL grant and CSI request, PUCCH resource #7 is used. Further in the example, if bits 10 are indicated, PUCCH resource #3 is used for HARQ-ACK and PUCCH resource #2 is used for CSI, if both are triggered simultaneously, separate PUCCH resources are used for the respective transmissions.

The agreement in RAN1 #90-AH3 only added support for A-CSI on short PUCCH. However, the same mechanism could be used to support A-CSI long PUCCH as well, which could be beneficial for reliability if e.g. CSI and HARQ-ACK is bundled together in a single PUCCH. Furthermore, it increases scheduling flexibility at the gNB.

Proposal 13  Aperiodic CSI feedback can be carried on long PUCCH

Open Issue #4: Support of SP-CSI on Short/Long PUCCH

In RAN1 #90, it was agreed that SP-CSI potentially could be supported on short PUCCH/long PUCCH/PUSCH, with potential down selection. In RAN1 #90-AH3 it was agreed that SP-CSI is supported on PUSCH, with LTE SPS-like triggering. Thus, the question remains if SP-CSI is supported on short/long PUCCH as well.

In RAN1 #89-AH2 Qingdao, it was agreed that Type I subband CSI can be carried on either one of PUSCH and long PUCCH. Since only WB CSI is supported for periodic CSI feedback, this implies that either A-CSI or SP-CSI (or both) must support being carried on long PUCCH for the agreement to be fulfilled. Furthermore, according to agree

TABLE 5

Example of differently interpreting the PUCCH resource indicator field depending on if DL-related DCI contains DL grant and/or CSI request

| PUCCH resource indicator bitfield | HARQ-ACK only | CSI only | HARQ-ACK + CSI |
| --- | --- | --- | --- |
| 00 | PUCCH resource #1 | PUCCH resource #3 | PUCCH resource #7 |
| 01 | PUCCH resource #2 | PUCCH resource #5 | PUCCH resource #8 |
| 10 | PUCCH resource #3 | PUCCH resource #2 | {PUCCH resource #3, PUCCH resource #2} |
| 11 | PUCCH resource #4 | PUCCH resource #6 | {PUCCH resource #4, PUCCH resource #6} |

Based on this discussion, we propose:

| | |
| --- | --- |
| Proposal 8 | To support aperiodic CSI feedback on PUCCH, a CSI request field can be configured to be present in DL-related DCI |
| Proposal 9 | PUCCH resource indicator field in DL-related DCI indicates PUCCH resource for the triggered CSI report |
| Proposal 10 | The field is interpreted differently depending on if DCI contains DL grant only, CSI request only, or both |
| Proposal 11 | Both bundling of HARQ-ACK and CSI in same PUCCH as well as indication of separate PUCCH is supported |

In the agreed WF, support of A-CSI on PUCCH for CSI triggering offsets larger than zero was left as a working assumption. It should be noted that Y=0 is the most difficult case for a UE to handle, as it requires fast CSI calculation. Since the mechanisms for A-CSI on PUCCH is introduced in the spec regardless, limiting its support to only Y=0 seems like a very artificial restriction. Therefore, we propose:

ment in RAN1 #90-AH3, the use of short or long PUCCH resource for a PUCCH-based CSI report is configured, meaning that either both short/long PUCCH or none of them must be supported for SP-CSI.

In order to keep down the number of reporting modes, we believe that it is sufficient to support SP-CSI on PUSCH and A-CSI on long PUCCH. Therefore, SP-CSI does not need to be supported for PUCCH Proposal 12  Confirm the working assumption to support A-CSI on PUCCH for Y > 0

Proposal 14    Semi-persistent CSI reporting on PUCCH is not supported

Open Issue #6: Determine Subband Sizes

In RAN1 #90-AH3, it was agreed that a subband is defined as N contiguous PRBs, where the value of N depends on the bandwidth of the active bandwidth part and that it is FFS if N is fixed for a certain bandwidth or is configurable from a set of values or if it depends on RBG/PRG size.

In LTE, the subband sizes are defined according to Table 6 below, where an 8 PRB subband size is used for the largest BW of 20 MHz (100 PRBs). The appropriate size of the subband is a trade-off between CSI accuracy/averaging loss and UL feedback overhead. As the UL carrier bandwidth (which relates to UL feedback capacity) may be smaller than the DL carrier bandwidth, it makes sense to increase the subband size with increasing DL carrier bandwidth to not overload the uplink with CSI (furthermore, the UL is generally more power-limited).

TABLE 6

Subband Size (k) vs. System Bandwidth in LTE

| System Bandwidth $N_{RB}^{DL}$ | Subband Size (k) |
| --- | --- |
| 6-7 | NA |
| 8-10 | 4 |
| 11-26 | 4 |
| 27-63 | 6 |
| 64-110 | 8 |

While NR supports carrier bandwidths of up to 100 MHz, it also supports variable subcarrier spacing, and the maximum number of PRBs, $N_{RB,DL}^{max,\mu}$, is equal to 275 PRBs. For simplicity, the subband size should depend on the number of resource blocks in the active BWP only and not the subcarrier spacing.

Regarding subband size dependence on PRG size, this may not be feasible since PRG size can change dynamically between two pre-configured values via triggering bit in DCI. Furthermore, agreed PRB bundling sizes are 2 and 4. From feedback overhead perspective, having smaller PRG size than 4 could be infeasible. Therefore, the subband size should be independent from PRG size. Regarding RBG, agreed RBG values are 2, 4, 8, 16. However, there are no agreements yet on if the RBG size is fixed or configured, therefore it is not clear if subband size can depends on RBG size. Furthermore, even if it does not make sense to report SB CQI with finer granularity than RBG size if Type 0 resource allocation is used, it could still be beneficial if Type I resource allocation is used, and PMI feedback can benefit from finer frequency-granularity regardless. Thus, subband size could be independent of RBG size as well.

Unless a benefit of configurable subband sizes can be shown, fixed subband sizes shall be configured. A starting point for discussion can be the values in Table 7 below.

Proposal 15    Adopt the subband sizes in Table 7 for NR

TABLE 7

Proposals for subband sizes in NR

| Bandwidth of active BWP $N_{RB,DL}^{\mu}$ | Subband Size (N) |
| --- | --- |
| 24-63 | 6 |
| 64-110 | 8 |
| 110-160 | 10 |
| 161-210 | 12 |
| 211-275 | 16 |

Open Issue #7: Detailed CBSR Scheme

In RAN1 #90, it was agreed that CBSR for Type I single-panel codebook ranks 3&4 with >=16 ports use a single bitfield and determines restricted $\tilde{v}_{l_2,m}$ depending on restricted $v_{l_1,m}$, but the details are FFS.

In our companion contribution [1], we present and motivate a way of achieving such CBSR. The detailed proposal is copied below for convenience.

Proposal 16    For codebook subset restriction for Type I single-panel codebook, beam restriction for rank 3-4 codebooks for 16,24 and 32 ports is based only on the bitmap of length $N_1N_2O_1O_2$ that defines the beam restriction for remaining ranks
A rank 3-4 PMI is restricted if it contains a restricted beam $\tilde{v}_{l_2,m}$
$\tilde{v}_{l_2,m}$ is restricted if any of $v_{l_1,m}$ such that $l_1 \in [\text{mod}(2l_2 - 1, N_1N_2O_1O_2), \text{mod}(2l_2 + 1, N_1N_2O_1O_2)]$ are restricted
Restriction of $v_{l_1,m}$ is given by the bitmap of length $N_1N_2O_1O_2$ Open Issue #8: CSI Reporting Periodicities Another open issue is what CSI reporting periodicities shall be supported for P/SP-CSI reporting. In LTE, periodicity of [1,2 depending on frame structure], 5, 10, 20, 40, 80, 160 ms can be configured, and this can be used as a starting point for NR as well. It has already been agreed that with SP-CSI containing Type II reports, the minimum periodicity is 5 ms. Thus, it can be discussed if 5 ms should be the minimum periodicity for other types of CSI as well.

| Proposal 17 | Consider at least 5, 10, 20, 40, 80, 160 ms as CSI reporting periodicities for P/SP-CSI |
|---|---|

Open Issue #9: Aperiodic CSI Triggering Offsets

In RAN1 #90-AH2 Qingdao, the following was agreed regarding aperiodic CSI triggering offsets on PUSCH:

For aperiodic CSI reporting on PUSCH, Y is indicated by DCI.
  DCI to be used for indicating the timing for PUSCH is also used to indicate Y.
    This applies to both UCI only and UCI+Data PUSCH
  The set of values is configured by higher layer
    The candidate set of values of Y is selected according to restricted conditions inferred from configuration of CSI related settings.
    The condition include at least;
      CSI parameter
      Number of CSI-RS antenna ports if PMI is included
      CSI-RS location
      Frequency granularity of CSI
      FFS: number of simultaneous CSI calculations
      FFS on mechanisms to relax CSI report timing according to number of simultaneous CSI calculations
      FFS different or same candidate Y value for the cases of UCI multiplexed with data and UCI only In our view, as Y=0 CSI feedback is supported for PUCCH, there is no need to further restrain the Y values for CSI on PUSCH. Instead, the same set of Y-values can be used regardless if UCI is present in PUSCH, unless it can be clearly motivated that such operation is unfeasible.

| Proposal 18 | Allowed PUSCH timing offsets Y are the same regardless if UCI is present or not |
|---|---|

CONCLUSIONS

In this contribution, we made the following observations:

| Observation 2 | Omission of SB CSI can generally be implemented by ordering the UCI bits such that SB CSI are mapped to the LSBs in the UCI and interleaving CSI bits on a per-subband basis. |
|---|---|
| Observation 3 | Triggering of A-CSI on PUCCH must be done with DL-related DCI. |

We make the following proposals:

| Proposal 1 | In the first part of a Type II CSI report, RI, NNZC(0) and NNZC(1) are mapped to independent fields in TS 38.212. |
|---|---|
| Proposal 2 | When UCI containing CSI is carried on PUSCH, UCI bits in the second CSI part are ordered so that WB CSI parameters are mapped to the MSBs while subband CSI parameters are mapped to the LSBs: Per-subband CSI parameters are interleaved according to a pre-defined pattern; If the number of UCI bits are larger than the number of available bits for UCI, the LSBs are truncated. |
| Proposal 3 | When CSI from multiple cells and/or multiple CSI reports are multiplexed in UCI on PUSCH, the following bit ordering is applied in the second CSI part: The WB CSIs for each cell/report are consecutively mapped to the MSBs of the second CSI part; The SB CSIs of the multiple cells/reports are grouped per subband and interleaved according to a pre-defined pattern. |
| Proposal 4 | The following subband interleaving pattern is used for UCI bit mapping: SB CSI corresponding to odd subband indices are mapped to the MSBs and SB CSI corresponding to even subband indices are mapped to the LSBs, in increasing subband index order. |
| Proposal 5 | To support aperiodic CSI feedback on PUCCH, a CSI request field can be configured to be present in DL-related DCI: PUCCH resource indicator field in DL-related DCI indicates PUCCH resource for the triggered CSI report; The field is interpreted differently depending on if DCI contains DL grant only, CSI request only, or both; Both bundling of HARQ-ACK and CSI in same PUCCH as well as indication of separate PUCCH is supported. |
| Proposal 6 | Confirm the working assumption to support A-CSI on PUCCH for Y > 0. |
| Proposal 7 | Aperiodic CSI feedback can be carried on long PUCCH. |
| Proposal 8 | Semi-persistent CSI reporting on PUCCH is not supported. |
| Proposal 9 | Adopt the subband sizes in Table 7 for NR. |
| Proposal 10 | For codebook subset restriction for Type I single-panel codebook, beam restriction for rank 3-4 codebooks for 16,24 and 32 ports is based only on the bitmap of length N1N2O1O2 that defines the beam restriction for remaining ranks: A rank 3-4 PMI is restricted if it contains a restricted beam vl2,m; |

-continued v12,m is restricted if any of vl1,m such that l1 ∈ [mod(2l2-1,N1N2O1O2),mod(2l2 + 1,N1N2O1O2)] are restricted;
Restriction of vl1,m is given by the bitmap of length N1N2O1O2.

Proposal 11 Consider at least 5, 10, 20, 40, 80, 160 ms as CSI reporting periodicities for P/SP-CSI.
Proposal 12 Allowed PUSCH timing offsets Y are the same regardless if UCI is present or not.

REFERENCES

R1-1718736 "On Codebook Subset Restriction", Ericsson, RAN1 #90bis, Prague

End Summary

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
1×RTT CDMA2000 1× Radio Transmission Technology
3GPP 3rd Generation Partnership Project
5G 5th Generation
ABS Almost Blank Subframe
ACK Acknowledge
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CE Control Element
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
CRI CSI/RS Resource Indicator
C-RNTI Cell RNTI
CSI Channel State Information
CSI-RS Channel State Information-Reference Signal
DCCH Dedicated Control Channel
DCI Downlink Control Information
DFT Discrete Fourier Transform
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
ID Identifier
LOS Line of Sight
LPP LTE Positioning Protocol
LSB Least Significant Bit
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MIMO Multiple-Input Multiple-Output
MME Mobility Management Entity
MSB Most Significant Bit
MSC Mobile Switching Center
MU-MIMO Multi-User MIMO
NACK Negative Acknowledge
NB Node B
NFV Network Function Virtualization
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRB Physical Resource Block
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
QPSK Quadrature Phase Shift Keying
RAN Radio Access Network RAT Radio Access Technology
RE Resource Element
RLM Radio Link Management
RNC Radio Network Controller
RNTI Radio Network Temporary Identifier
RPI Relative Power Indicator
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
RX Receive/Receiver
SB Subband
SB amp Subband Amplitude
SCH Synchronization Channel
SCell Secondary Cell
SDN Software Defined Networking
SDU Service Data Unit
SFN System Frame Number
SGW Serving Gateway
SI System Information
SIB System Information Block
SNR Signal to Noise Ratio
SON Self Optimized Network
SS Synchronization Signal
SPS Semi-Persistent Scheduling
SR Scheduling Request
SSS Secondary Synchronization Signal
SU-MIMO Single-User MIMO
TDD Time Division Duplex
TDOA Time Difference of Arrival
TOA Time of Arrival
TS Technical Specification
TSS Tertiary Synchronization Signal
TTI Transmission Time Interval
TX Transmit/Transmitter
UCI Uplink Control Information
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WB Wideband
WB amp Wideband Amplitude
WCDMA Wide CDMA
WLAN Wide Local Area Network

The invention claimed is:

1. A method performed in a wireless device for reporting channel state information (CSI), the method comprising:
receiving an indication of a resource allocation for an uplink (UL) transmission;
determining, from the indication, a maximum container size for transmitting a CSI report comprising a first CSI part and a second CSI part; and
transmitting the first CSI part and at least a portion of the second CSI part based on the determined maximum container size, wherein the second CSI part comprises respective groups of CSI of partial subbands, where each group of partial subbands correspond to a particular priority level, and wherein an omitted portion of the second CSI part that corresponds to a particular priority level comprises all the CSI of the group of CSI of partial subbands at the particular priority level.

2. The method of claim 1, wherein transmitting the first CSI part and the at least a portion of the second CSI part comprises transmitting the first CSI part and the at least a portion of the second CSI part when the maximum container size is less than a total size of the first CSI part and the second CSI part.

3. The method of claim 2, wherein:
the second CSI part comprises:
wideband CSI for each of a plurality of CSI reports each associated with a respective priority level; and
subband CSI for a plurality of subbands for each of the plurality of CSI reports; and
transmitting the first CSI part and the at least a portion of the second CSI part comprises:
transmitting the wideband CSI for each of the plurality of CSI reports; and
omitting the subband CSI for one or more of the plurality of subbands for one or more of the plurality of CSI reports.

4. The method of claim 3, wherein omitting the subband CSI for one or more of the plurality of subbands for one or more of the plurality of CSI reports comprises:
prioritizing the plurality of CSI reports; and
omitting the subband CSI for one or more of the plurality of subbands for one or more lower priority CSI reports among the plurality of CSI reports.

5. The method of claim 3, wherein omitting the subband CSI for one or more of the plurality of subbands for one or more of the plurality of CSI reports comprises:
prioritizing the subband CSI in the following decreasing order of priority: (a) the subband CSI for even subbands for an n-th CSI report of the plurality of CSI reports and (b) the subband CSI for odd subbands for the nth CSI report, for n=1 to N; and
omitting the subband CSI based on priority such that a total size of the first CSI part and the non-omitted part of the second CSI part is less than or equal to the maximum container size.

* * * * *